US012629933B2

(12) United States Patent
Monney et al.

(10) Patent No.: US 12,629,933 B2

(45) Date of Patent: May 19, 2026

(54) PRINTING UNIT COMPRISING AN ALIGNMENT DEVICE, NON-IMPACT PRINTING POSITION, AND CURING DEVICE

(71) Applicant: KOENIG & BAUER AG, Würzburg (DE)

(72) Inventors: Angèle Monney, Fribourg (CH); Michael Müller, Karlstadt (DE); Emmanuel Thony, Rennaz (CH)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/842,130

(22) PCT Filed: May 25, 2023

(86) PCT No.: PCT/EP2023/064018

§ 371 (c)(1),
(2) Date: Aug. 28, 2024

(87) PCT Pub. No.: WO2023/247133

PCT Pub. Date: Dec. 28, 2023

(65) Prior Publication Data

US 2025/0100269 A1 Mar. 27, 2025

(30) Foreign Application Priority Data

Jun. 22, 2022 (DE) ..................... 10 2022 115 533.1

(51) Int. Cl.
*B41F 19/00* (2006.01)
*B41F 15/08* (2006.01)
(Continued)

(52) U.S. Cl.
CPC ........ *B41F 19/007* (2013.01); *B41F 15/0809* (2013.01); *B41F 21/04* (2013.01);
(Continued)

(58) Field of Classification Search
CPC .... B41F 15/0809; B41F 19/007; B41F 21/04; B41F 23/045; B41J 3/50
See application file for complete search history.

(56) References Cited

U.S. PATENT DOCUMENTS 4,067,020 A * 1/1978 Arway ..................... B41J 2/175 347/7
7,876,345 B2 * 1/2011 Houjou ................ B41M 5/0256 347/213
(Continued)

FOREIGN PATENT DOCUMENTS

CN 103547454 A 1/2014
CN 107949478 A 4/2018
(Continued)

OTHER PUBLICATIONS

International Search Report of PCT/EP2023/064018 dated Aug. 25, 2023.
(Continued)

*Primary Examiner* — Jill E Culler
(74) *Attorney, Agent, or Firm* — MATTINGLY & MALUR, PC

(57) ABSTRACT

Examples include a printing unit, which has at least one first tool-dependent printing nip formed by a pair of cooperating rotational bodies. The printing unit includes, downstream from the first tool-dependent printing nip, along a transport path provided for a transport of substrate, at least one first alignment cylinder and at least one first non-impact printing position, to which at least one first print head is assigned. The printing unit further includes, downstream from the first non-impact printing position, along the transport path provided for the transport of substrate, at least one first curing device having a first curing area assigned thereto. Additionally, in the region of the first non-impact printing position, the transport path provided for the transport of substrate is
(Continued)

defined by the first alignment cylinder or a rotational transport body arranged directly upstream from the first alignment cylinder.

14 Claims, 14 Drawing Sheets

(51) Int. Cl.

| | |
|---|---|
| ***B41F 21/04*** | (2006.01) |
| ***B41F 23/04*** | (2006.01) |
| ***B41J 3/50*** | (2006.01) |

(52) U.S. Cl.

CPC ........ *B41F 23/045* (2013.01); *B41F 23/0453* (2013.01); *B41J 3/50* (2013.01)

(56) References Cited

U.S. PATENT DOCUMENTS

| | | | | |
|---|---|---|---|---|
| 8,499,687 | B2 * | 8/2013 | Gygy | B41F 13/18 492/8 |
| 10,279,582 | B2 * | 5/2019 | Schaede | B41F 15/12 |
| 11,110,697 | B2 * | 9/2021 | Bauer | B41F 5/24 |
| 2008/0006176 | A1 * | 1/2008 | Houjou | B41J 2/01 106/31.13 |
| 2016/0067974 | A1 * | 3/2016 | Williams | B41J 2/175 347/20 |
| 2018/0244038 | A1 * | 8/2018 | Ziegenbalg | B41F 19/008 |

FOREIGN PATENT DOCUMENTS

| | | | | | |
|---|---|---|---|---|---|
| CN | 114132052 | A | * | 3/2022 | B41F 13/02 |
| DE | 19514259 | A1 | * | 10/1996 | B41F 13/0032 |
| DE | 102017204598 | A1 | | 9/2018 | |
| DE | 102020100442 | A1 | | 7/2021 | |
| DE | 102020102621 | A1 | | 8/2021 | |
| DE | 102020106154 | A1 | | 9/2021 | |
| DE | 102022109034 | B3 | | 3/2023 | |
| DE | 102022109038 | B3 | | 3/2023 | |
| EP | 0805050 | A2 | * | 11/1997 | B41M 7/00 |
| EP | 2084005 | B1 | | 6/2012 | |
| EP | 2007581 | B1 | | 7/2012 | |
| EP | 3191307 | A1 | | 7/2017 | |
| GB | 2512238 | A | * | 9/2014 | B41F 11/00 |
| JP | 2022002906 | A | | 1/2022 | |
| WO | 2009022317 | A1 | | 2/2009 | |
| WO | 2016030819 | A1 | | 3/2016 | |
| WO | 2016038572 | A1 | | 3/2016 | |
| WO | 2020148076 | A1 | | 7/2020 | |
| WO | 2021259527 | A1 | | 12/2021 | |

OTHER PUBLICATIONS

Chinese Office Action received in corresponding Chinese Application No. 202380024430.4 dated Jan. 21, 2026.

* cited by examiner

700

700

PRINTING UNIT COMPRISING AN ALIGNMENT DEVICE, NON-IMPACT PRINTING POSITION, AND CURING DEVICE

CROSS-REFERENCES TO RELATED APPLICATIONS

This application is the US national phase, under 35 USC § 371, of PCT/EP2023/064018, filed on May 25, 2023, published as WO 2023/247133 A1 on Dec. 28, 2023, and claiming priority to DE 10 2022 115 533.1, filed Jun. 22, 2022, and all of which are incorporated by reference herein in their entireties.

TECHNICAL FIELD

Some examples herein relate to a printing unit comprising an alignment device, to a non-impact printing position, and to a curing device. For example, the printing unit is designed as a screen printing unit and includes at least one first tool-dependent printing nip that is designed as a screen printing nip and formed by a pair of cooperating rotational bodies, which are designed as a screen printing forme cylinder and an impression cylinder cooperating therewith. The printing unit, along a transport path provided for a transport of substrate, downstream from the impression cylinder of the first tool-dependent printing nip includes at least one first alignment cylinder, which, in the region of the outer circumference thereof, comprises a plurality of elements inducing a magnetic field. The printing unit, along the transport path provided for the transport of substrate, downstream from the first tool-dependent printing nip, includes at least one first non-impact printing position to which at least one first print head is assigned. The printing unit, along the transport path provided for the transport of substrate, downstream from the first non-impact printing position includes at least one first curing device having a first curing area assigned thereto. Additionally, some examples include a printing machine that includes at least one printing unit as discussed above.

BACKGROUND

It is known to apply coating agent comprising magnetic or magnetizable particles to substrate and then align the particles by means of an alignment device operating, for example, with magnetic fields. This allows optical effects that are dependent on the viewing angle to be generated, which can be fixed by curing the coating agent.

A method is known from WO 2021/259527 A1, in which a layer of a cross-linkable coating agent comprising magnetic or magnetizable particles is applied to a substrate by means of a screen printing method and these particles are oriented parallel to one another by means of an alignment device, wherein thereafter a further layer is applied by means of an ink jet printing device and in the process the parallel orientation of these particles is partially canceled again, and wherein thereafter the layer of the coating agent is cross-linked by means of radiation.

It is known from WO 2020/148076 A1 to apply coating agent comprising magnetic or magnetizable particles to a substrate and to align them, and to deliberately cure them by means of a matrix made of individually activatable UV LEDs so as to generate a motif.

A printing machine is known from EP 2 007 581 B1, which comprises an ink jet printing device upstream from a screen printing device.

A method is known from EP 2 084 005 B1, in which a cross-linkable substance is applied to a substrate by means of an ink jet printing device and thereafter is cured by means of UV radiation.

A sheet-fed printing machine is known from DE 10 2020 102 621 A1, comprising an offset printing unit and a screen printing unit as well as an alignment device and a curing device.

A sheet-fed printing machine is known from both DE 10 2022 109 034 B3 and DE 10 2022 109 038 B3, which comprises a screen printing unit, an alignment device, and a curing device.

A sheet-fed printing machine is from WO 2009/022317 A1, which comprises two screen printing mechanisms and an interposed alignment device.

A sheet-fed printing machine is known from WO 2016/030819 A1, comprising a screen printing unit, a gravure printing unit, an alignment device, and a curing device.

A sheet-fed printing machine is known from DE 10 2017 204 598 A1, which comprises a magnetic cylinder for holding tools.

A sheet-fed printing machine is known from DE 10 2020 106 154 A1, comprising an offset printing unit and a screen printing unit as well as an alignment device and a curing device.

A sheet-fed printing machine is known from JP 2022-002906 A, which comprises a screen printing unit as well as two alignment devices and corresponding curing devices.

A gravure printing machine is known from DE 10 2020 100 442 A1, which comprises at least one ink jet print head, which is arranged to apply a printing fluid in such a way that, as a result, a gravure printing ink printed onto a substrate is covered. For this purpose, the ink jet print head is arranged so as to be aligned with the substrate downstream from the gravure printing nip or is arranged so as to be aligned with the printing forme of the gravure printing cylinder upstream from the inking nip. A magnetic printing fluid is mentioned, which is magnetizable or magnetic or alignable or aligned by magnetization.

A combined printing machine is known from WO 2016/038572 A1, corresponding to EP 3 191 307 A1, which comprises a screen printing unit including an alignment cylinder, a numbering unit, and a varnishing device.

SUMMARY

An object of some examples herein is to provide a printing unit comprising an alignment device, a non-impact printing position, and a curing device.

The object is achieved in some examples by the printing unit discussed above in which, in the region of the first non-impact printing position, the transport path provided for the transport of substrate is defined by the first alignment cylinder or a rotational transport body arranged directly upstream from the first alignment cylinder.

Further, in some examples, the printing machine discussed above includes at least one further printing unit, which is designed as a simultaneous printing unit and/or that the printing machine additionally comprises at least one further printing unit, which is designed as a numbering printing unit and/or that the printing machine additionally comprises at least one further printing unit, which is designed as a flexographic printing unit.

A printing unit comprises at least a first tool-dependent printing nip formed by a pair of cooperating rotational bodies, wherein the printing unit, along a transport path provided for a transport of substrate, downstream from the first tool-dependent printing nip comprises at least a first alignment cylinder, and wherein the printing unit, along the transport path provided for the transport of substrate, downstream from the first tool-dependent printing nip comprises at least a first non-impact printing position, having at least a first print head assigned thereto, and wherein the printing unit, along the transport path provided for the transport of substrate, downstream from the first non-impact printing position comprises at least a first curing device, having a first curing area assigned thereto. In the region of the first non-impact printing position, the transport path for the transport of substrate is defined by the first alignment cylinder or a rotational transport body arranged directly upstream from the first alignment cylinder. In this way, coating agent comprising alignable particles can be applied to substrate by means of the tool-dependent print nip and only be provided with only an in particular colorless additive by the at least one print head and thereby be selectively cured in the curing device. It is thus possible to write image information into the coating agent by means of the at least one print head, and thereafter to fix this image information. This allows such image information to be added to the coating agent with a very high resolution and in a particularly simple manner.

In al refinement, the printing unit is preferably characterized in that, in the first curing area of the at least one first curing device, the transport path provided for the transport of substrate is defined by the first alignment cylinder or a rotational transport body arranged directly downstream from the first alignment cylinder. Since it was defined, by means of the at least one print head, which areas are to be cured, the curing can still take place on the alignment cylinder or, if the alignment is sufficiently stable, also downstream from the alignment cylinder. This allows an installation based on the spatial conditions. Moreover, a relatively simple curing device can be employed.

In a refinement, the printing unit is preferably characterized in that an in particular colorless additive is situated in a supply reservoir which, in terms of conduction, is connected to the at least one first print head, the additive being in particular designed as an additive for changing the curing properties of applied material. This material is, in particular, a mixture of, for example, coating agent embodied as printing ink and this additive. This preferably allows the image information to be generated simply by assigning a location on the substrate, without influencing the color properties of the coating agent.

The first tool-dependent printing nip is designed as a screen printing nip. In this way, it is possible to generate particularly thick layers of coating agent having accordingly easily visible effects.

In a refinement, the printing unit is preferably characterized in that a rotational transport body, which is arranged along the transport path provided for the transport of substrate directly downstream from an impression cylinder of the first tool-dependent printing nip, is designed as a transfer drum and/or as a blower drum and/or as a suction drum and/or as a rotational transport body operating in a contactless manner, with the exception of gripper contacts. The substrate can thus preferably be transported without negatively influencing the coating agent applied by the tool-dependent printing nip.

In a refinement, the printing unit is preferably characterized in that the at least one first print head is designed as an ink jet print head and/or that the respective alignment cylinder, in the region of the outer circumference thereof, comprises a plurality of elements inducing a magnetic field and/or that the curing device comprises at least one radiation source for UV radiation and/or at least one electron beam source.

In a refinement, the printing unit is preferably characterized in that the printing unit is designed as a sheet-fed printing unit. The printing unit can then be integrated, for example, into a securities printing machine, which usually prints sheets.

In a refinement, the printing unit is preferably characterized in that the printing unit, along the transport path provided for the transport of substrate, downstream from the at least one first alignment cylinder comprises at least one second alignment cylinder. In a refinement, the printing unit is preferably characterized in that the printing unit, along the transport path provided for the transport of substrate, downstream from the first alignment cylinder comprises at least one second non-impact printing position, having at least one second print head assigned thereto. In a refinement, the printing unit is preferably characterized in that the printing unit, along the transport path provided for the transport of substrate, downstream from the second non-impact printing position comprises at least one second curing device, having a second curing area assigned thereto. Advantageously, this allows several image portions having several different orientations of pigments to be generated by subjecting coating agent that has not yet been fixed to an alignment, mixing it with an additive in partial regions, and thereafter thus only curing it in these partial regions, so that subsequently still uncured partial regions can likewise be treated in this manner.

In a refinement, the printing unit is preferably characterized in that, in the region of the second non-impact printing position, the transport path provided for the transport of substrate is defined by the second alignment cylinder or a rotational transport body arranged directly upstream from the second alignment cylinder and/or that, in the second curing area of the at least one second curing device, the transport path provided for the transport of substrate is defined by the second alignment cylinder or a rotational transport body arranged directly downstream from the second alignment cylinder. In an alternative or additional refinement, the printing unit is preferably characterized in that any tool-dependent printing nip of the printing unit is arranged upstream from the first non-impact printing position and/or downstream from the second non-impact printing position.

In a refinement, the printing unit is preferably characterized in that an in particular colorless additive is situated in a supply reservoir which, in terms of conduction, is connected to the at least one second print head, in particular an additive for changing the curing properties of applied material.

The printing unit preferably comprises at least one forme cylinder and at least one impression cylinder cooperating therewith. In a refinement, the printing unit is preferably characterized in that the printing unit comprises at least one frame, which comprises at least two frame side walls located opposite one another in a transverse direction. In a refinement, the printing unit is preferably characterized in that the printing unit comprises at least one first base module and at least one second base module, and that each base module in each case comprises two respective single-piece and stationary base side walls, which are each an integral part of a respective frame side wall, and that the respective base module in each case comprises four installation areas for rotational transport bodies, and that the relative positions of the four installation areas of the first base module with respect to one another coincide with the relative positions of the four installation areas of the second base modules with respect to one another. In a refinement, the printing unit is preferably characterized in that the respective first installation area along the transport path provided for the transport of substrate and the respective second installation area of the respective base module along this transport path form a respective selection group of the respective base module, and that an impression cylinder, forming a first tool-dependent printing nip together with a forme cylinder, is arranged in exactly one of the installation areas of the selection group of the first base module, and that a respective rotational transport body is arranged in each of the at least four installation areas of the two base modules, and that at least one print head of a non-impact printing position is arranged so as to be aligned with a cylinder that is arranged in an installation area of the first base module. In a refinement, the printing unit is preferably characterized in that at least one print head of a further non-impact printing position is arranged so as to be aligned with a cylinder that is arranged in an installation area of the second base module. By using identical base modules, production complexity can be decreased, and costs and resources can thus be saved.

In a refinement, the printing unit is preferably characterized in that a functionally different rotational transport body is arranged in at least one installation area of the first base module than in a corresponding installation area, in terms of the installation position thereof, of the second base module. This is a particularly advantageous application of the modular design. In a refinement, the printing unit is preferably characterized in that the impression cylinder arranged in one of the installation areas of the selection group of the first base module is arranged so as to form a screen printing nip together with a screen printing forme cylinder.

In a refinement, the printing unit is preferably characterized in that an impression cylinder is arranged in a first installation area of the first base module along the transport path provided for the transport of substrate, and that a rotational transport body designed as a transfer drum and/or as a blower drum and/or as a suction drum and/or a rotational transport body operating in a contactless manner, with the exception of gripper contacts, is arranged in a second installation area of the first base module along the transport path provided for the transport of substrate, and that a rotational transport body designed as a first alignment cylinder is arranged in a third installation area of the first base module along the transport path provided for the transport of substrate, and that a rotational transport body designed as a transfer drum and/or as a blower drum and/or as a suction drum and/or a rotational transport body operating in a contactless manner, with the exception of gripper contacts, is arranged in a fourth installation area of the first base module along the transport path provided for the transport of substrate. In a refinement, the printing unit is preferably characterized in that the at least one print head of the non-impact printing position is arranged so as to be aligned with the rotational transport body in the second installation area of the first base module or the rotational transport body in the third installation area of the first base module and/or that a first curing area of a first curing device is arranged so as to be aligned with the rotational transport body in the third installation area of the first base module or the rotational transport body in the fourth installation area of the first base module.

In a refinement, the printing unit is preferably characterized in that an impression cylinder is arranged in a second installation area of the second base module along the transport path provided for the transport of substrate, and that a rotational transport body designed as a transfer drum and/or as a blower drum and/or as a suction drum and/or a rotational transport body operating in a contactless manner, with the exception of gripper contacts, is arranged in a third installation area of the second base module along the transport path provided for the transport of substrate, and that a rotational transport body designed as a further alignment cylinder is arranged in a fourth installation area of the second base module along the transport path provided for the transport of substrate. In a refinement, the printing unit is preferably characterized in that the at least one print head of the further non-impact printing position is arranged so as to be aligned with the rotational transport body in the third installation area of the second base module or the rotational transport body in the fourth installation area of the second base module and that a further curing area of a further curing device is arranged so as to be aligned with the rotational transport body in the fourth installation area of the second base module or a rotational transport body following the same outside the second base module.

In a refinement, the printing unit is preferably characterized in that a rotational transport body designed as a further alignment cylinder is arranged in a first installation area of the second base module along the transport path provided for the transport of substrate. In a refinement, the printing unit is preferably characterized in that the at least one print head of the further non-impact printing position is arranged so as to be aligned with the alignment cylinder in the first installation area of the second base module or the rotational transport body arranged upstream thereof and/or that a further curing area of a further curing device is arranged so as to be aligned with the alignment cylinder in the first installation area of the second base module or the rotational transport body in the second installation area of the second base module.

An inspection unit is preferably designed as a separate module, wherein the at least one inspection unit comprises at least one rotational transport body for transporting sheets, with which at least one inspection device is aligned. In a refinement, the inspection unit is preferably characterized by comprising a dedicated frame, which rotatably carries the at least one rotational transport body, and/or that the inspection unit comprises an input interface for receiving sheets and an output interface for delivering sheets. In a refinement, the inspection unit is preferably characterized in that the input interface and the output interface are arranged at the same height. Such an inspection unit can then be integrated particularly easily at different points in a printing machine.

In a refinement, the inspection unit is preferably characterized in that the at least one inspection device is arranged so as to be aligned from above with a respective rotational transport body and/or that the at least one inspection device is arranged so as to be aligned from beneath with a respective rotational transport body.

An exemplary printing machine preferably comprises at least one above-described printing unit and is preferably furthermore characterized in that the printing machine additionally comprises at least one further printing unit which is designed as a simultaneous printing unit and/or which is designed as a numbering printing unit and/or which is designed as a flexographic printing unit.

In a refinement, the printing machine is preferably characterized in that the printing machine comprises at least one sheet feeder and at least one printing unit and at least one sheet delivery and at least one above-described inspection unit. In a refinement, the printing machine is preferably characterized in that the respective frame of the at least one inspection unit differs from a frame of the sheet feeder and from a frame of the at least one printing unit and from a frame of the at least one sheet delivery.

BRIEF DESCRIPTION OF THE DRAWINGS

Exemplary embodiments of the invention are illustrated in the drawings and will be described in greater detail below. The figures show.

DETAILED DESCRIPTION

Figure 2:
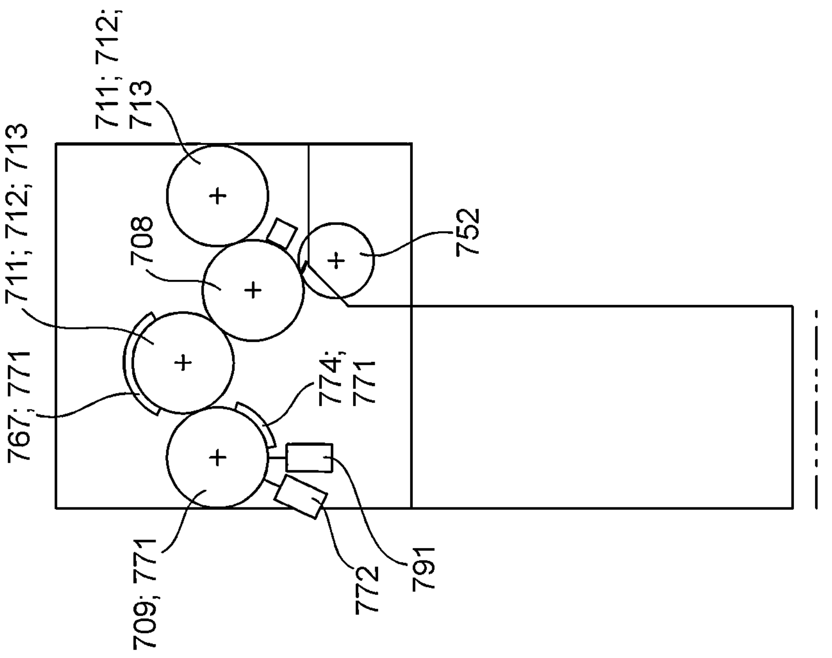
FIG. 2 a schematic representation of a printing unit comprising a tool-dependent printing nip, a non-impact printing position, an alignment device, and a curing device.

A printing machine 01 is preferably designed as a securities printing machine 01. The printing machine 01 is preferably designed as a sheet-fed printing machine 01. The sheet-fed printing machine 01 is preferably designed as a securities printing machine 01. Hereafter, the printing machine 01 will be described as a sheet-fed printing machine 01. With an appropriate configuration of the printing machine 01, the invention can likewise be used as a web-fed printing machine. The sheet-fed printing machine 01 is preferably designed as a rotary printing machine 01, in particular a sheet-fed rotary printing machine 01. The sheet-fed printing machine 01 preferably comprises at least one sheet processing unit 200; 500; 600; 700. The at least one sheet processing unit 200; 500; 600; 700 is designed as a sheet-fed printing unit 200; 500; 600; 700, for example. The sheet-fed printing machine 01 is used to print substrate 02, in particular in the form of sheets 02. The sheets 02 are formed, for example, of cellulose-based or preferably cotton fiber-based paper, of plastic polymer or of a hybrid product thereof. Prior to being processed by the sheet-fed printing machine 01, the sheets 02 may be uncoated or may already have been coated. The sheets 02 may be unprinted or already have been printed once or multiple times or have been mechanically processed in another manner. Preferably, several multiple-up copies, in particular print images of banknotes to be produced, are arranged in a row next to one another on a sheet 02, and several such rows of multiple-up copies or the print image thereof are arranged one behind the other in the transport direction T or are accordingly arranged in the course of the processing operation of the particular sheet 02.

The sheet-fed printing machine 01 preferably comprises at least one substrate feed device 100 or sheet feed device 100 designed as a sheet feeder 100, in particular in addition to the at least one sheet processing unit 200; 500; 600; 700 and/or along a transport path provided for a transport of substrate 02 or sheets 02 upstream from the at least one, and more preferably upstream from each, sheet processing unit 200; 500; 600; 700. The at least one substrate feed device 100 preferably includes a conveyor line 101 designed, for example, as a feed table 101. For example, the substrate feed device 100 comprises at least one non-stop device for an uninterrupted supply of sheets 02, including when a succeeding pile is provided. The feed table arranged downstream from the sheet pile is designed as a suction feed table. For example, at least one infeed device referred to as a sheet infeed is provided, which preferably comprises a feed table and comprises at least one movable front stop. The sheet feeder 100 preferably comprises at least one rocking gripper or rocker. A receiving drum 104 is preferably arranged downstream from the rocking gripper along the transport path provided for the transport of substrate 02. Preferably, sheets 02 are transferred from the rocking gripper to the receiving drum 104. The receiving drum 104 is a rotational transport body 104.

The sheet-fed printing machine 01 preferably comprises at least one unit 900 designed as a delivery device 900, in particular a sheet delivery 900, in particular in addition to the at least one sheet processing unit 200; 500; 600; 700 and/or along the transport path provided for the transport of substrate 02 downstream from the at least one sheet feeder 100, and more preferably downstream from each sheet processing unit 200; 500; 600; 700. The sheet delivery 900 preferably comprises at least one sheet conveyor system 904, which is in particular designed as a chain conveyor system 904 or chain gripper system 904. The sheet conveyor system 904 comprises, for example, traction means moved by way of driving and deflection means, which drive gripping devices for conveying the sheets. For example, a sheet guide device and/or a drying and/or curing device 906 are arranged in the sheet delivery 900. For example, the sheet delivery 900 is equipped with a non-stop device for transporting delivery piles away without interruption.

Alternatively or additionally, the delivery device 900, along the transport path provided for the transport of the substrate 02 and/or the sheets 02, comprises at least two, more preferably at least three, delivery stations 901; 902; 903 that are arranged one behind the other along the transport path provided for the transport of substrate 02. The at least one delivery device 900 is thus preferably designed as a multiple pile delivery unit 900, in particular at least as a dual pile delivery unit 900 or at least as a triple pile delivery unit 900 or at least as a quadruple pile delivery unit 900. The delivery stations 901; 902; 903 are also referred to as pile deliveries 901; 902; 903.

The transport path provided for the transport of substrate 02, in particular for the transport of at least partially separated sheets 02, preferably starts at the substrate feed device 100 and/or preferably ends at the sheet delivery 900. Piles comprising several sheets 02 are preferably fed to the substrate feed device 100 and/or removed from the sheet delivery 900. The transport path of these piles shall not be considered to be part of the transport path provided for the transport of substrate 02. For example, at least one full sheet control device is arranged along the transport path provided for the transport of substrate 02. This device is used, in particular, to detect an arrival at an expected time and/or an expected shape of side edges of the sheets 02. The full sheet control device comprises, for example, at least one source for electromagnetic radiation, in particular visible light, and a sensor for electromagnetic radiation, in particular visible light.

In the case of a curved transport path, a transport direction T is preferably in each case the direction T that runs tangential to a segment and/or point of the provided transport path closest to a respective reference point and that is provided for the transport of the substrate 02 and/or sheet 02 at this segment and/or point. This respective reference point is preferably situated at the point and/or at the component that is being related to the transport direction T. The transport direction T thus preferably in each case extends along the transport path provided for substrate 02 and/or sheets 02. A transverse direction A is preferably a direction A that extends orthogonally to the transport direction T and horizontally.

The printing machine 02, in particular sheet-fed printing machine 01, comprises at least one processing unit 200; 500; 600; 700, in particular sheet processing unit 200; 500; 600; 700. For example, the sheet-fed printing machine 01 comprises at least two or even more sheet processing units 200; 500; 600; 700. The at least one processing unit 200; 500; 600; 700, in particular sheet processing unit 200; 500; 600; 700, is preferably at least also designed as a printing unit 200; 500; 600; 700, in particular a sheet-fed printing unit 200; 500; 600; 700. A sheet-fed printing unit 200; 500; 600; 700 shall possibly also, generally speaking, be understood to mean a sheet coating unit 200; 500; 600; 700, that is, in particular also a sheet varnishing unit 200; 500; 600; 700. The sheet-fed printing machine 01 comprises, for example, several printing units 200; 500; 600; 700, which are assigned to different printing methods.

The printing machine 01 preferably comprises at least one printing unit 700, which is used to generate optically variable image elements 700 designed, in particular, as security features. Above and below, this is described based on the example of a printing unit 700 designed, in particular, as a screen printing unit 700. This printing unit 700, however, can also operate according to another, in particular tool-dependent, printing method and, for example, be designed as an intaglio printing unit or as a flexographic printing unit. The sheet-fed printing machine 01 preferably comprises at least one printing unit 700, which is in particular designed as a screen printing unit 700 and/or as a sheet-fed printing unit 700. As a result of the screen printing method, a particularly large film thickness can be applied. The printing unit 700 designed, in particular, as a screen printing unit 700 is used in particular for generating optically variable image elements, in particular security elements, on the sheets 02. The printing unit 700 designed, in particular, as a screen printing unit 700 preferably comprises at least one impression cylinder 708 and a forme cylinder 752 cooperating therewith, which is preferably designed as a screen printing forme cylinder 752. Together, the two form a respective printing nip 758, in particular screen printing nip 758. In this way, coating medium, in particular printing ink, can be applied in the customary manner onto sheets 02.

Preferably, at least one optically variable coating agent is employed, in particular at least one optically variable printing ink and/or at least one optically variable varnish. This optically variable coating agent is applied, for example, across the entire surface area or preferably in partial regions in the form of first print image elements. The printing unit 700 designed, in particular, as a screen printing unit 700 preferably comprises at least one alignment device 771 for aligning particles which are contained in the optically variable coating agent that is applied to the particular sheet 02 and which are responsible for the optical variability. Particles responsible for the optical variability that are preferably contained in the particular coating agent, in particular in the printing ink or in the varnish, are magnetic or magnetizable, non-spherical particles, for example, pigment particles, here also referred to as magnetic particles or flakes for short. The at least one alignment device 771, for example, comprises several components. The printing unit 700 designed, in particular, as a screen printing unit 700 preferably comprises at least one alignment cylinder 709. This at least one alignment cylinder 709 is preferably an integral part of a respective alignment device 771. The printing unit 700 designed, in particular, as a screen printing unit 700 preferably comprises at least one pre-alignment device 767. This at least one pre-alignment device 767 is preferably an integral part of a respective alignment device 771. The printing unit 700 designed, in particular, as a screen printing unit 700 preferably comprises at least one simultaneous alignment device 774. This at least one simultaneous alignment device 774 is preferably an integral part of a respective alignment device 771.

The printing unit 700 designed, in particular, as a screen printing unit 700 preferably comprises at least one drying device 772 or curing device 772. The at least one respective curing device 772 is preferably used to fix an alignment of magnetic or magnetizable particles. The at least one curing device 772 is preferably arranged on the transport path provided for the transport of substrate 02 behind the or in the region of a respective alignment cylinder 709. The at least one curing device 772 is preferably designed as an in particular narrow-band radiation dryer 772, for example as a UV dryer 772, in particular a LED dryer 772, and more preferably a UV LED dryer 772. As an alternative or in addition, the at least one curing device 772 is designed as an electron beam dryer 772. The respective curing device 772 is, for example, arranged along the transport path provided for the transport of sheets 02 so as to be directed, in the direction of an outer cylindrical surface of the respective alignment cylinder 709 or another rotational transport body 711; 712; 713, at the transport angle W726; W728; W729 thereof, over which the sheets 02 are conveyed by means of the respective alignment cylinder 709 or other rotational transport body 711; 712; 713. In one embodiment, at least one curing device 772 is arranged in such a way that the curing area 788 thereof, with respect to a rotational transport body 711; 712; 713 cooperating therewith, is located radially further to the outside than the curing device 772 itself. An inner side of a sheet 02 can then be dried, for example when the curing device 772 is assigned to a rotational transport body 711; 712; 713 which directly follows an alignment cylinder 709. So as to avoid unnecessary heating, the curing device 772 preferably operates in a narrow-band wavelength range that favors curing, for example, in a wavelength band having a spectral full width at half maximum, based on the radiant power, of no more than 50 nm, and preferably no more than 30 nm. The maximum radiation preferably has a wavelength of 385±25 nm, and in particular 385±15 nm.

In a likewise advantageous refinement of the printing machine 01, a drying and/or curing device 906 that is effective over the entire substrate width, for example a radiation dryer 906, in particular a UV dryer 906 or electron beam dryer 906, is provided downstream from a last alignment device 771 for thoroughly drying the coating agent applied to the sheets 02.

The printing unit 700 designed, in particular, as a screen printing unit 700 preferably comprises an in particular stationary frame 701, which has at least two in particular stationary frame side walls 702; 703. The printing unit 700 designed, in particular, as a screen printing unit 700 can be configured in various embodiments. These embodiments preferably have in common that the respective printing unit 700 in each case comprises at least one, in particular stationary, base module 704. The respective base module 704 has two, in particular stationary, base side walls 706; 707 which are located opposite one another, and in particular opposite in the transverse direction A. Preferably, each base side wall 706; 707 is embodied in one piece, for example cast. At the same time, these base side walls 706; 707 are part of the, in particular stationary, frame 701 of the printing unit 700 designed, in particular, as a screen printing unit 700. These base side walls 706; 707 are preferably each an integral part of a respective frame side wall 702; 703. The frame side walls 702; 703 of the printing unit 700 designed, in particular, as a screen printing unit 700 are arranged opposite one another, in particular opposite in the transverse direction A. The frame side walls 702; 703 are preferably connected, in particular rigidly, to one another via at least one, in particular stationary, cross member 723. The base side walls 706; 707 are preferably connected, in particular rigidly, to one another via at least one, in particular stationary, cross member 723.

Four installation areas 726; 727; 728; 729 for rotational transport bodies 708; 709; 711; 712; 713 are in each case defined by the respective base module 704. A rotational transport body 708; 709; 711; 712; 713 shall be understood to mean an assembly 708; 709; 711; 712; 713 that is arranged rotatably about a respective axis of rotation 716; 717; 718; 719 and is used to transport sheets 02. Examples of rotational transport bodies 708; 709; 711; 712; 713 are impression cylinders 708, alignment cylinders 709, transfer drums 711, blower drums 712 and suction drums 713. Another example of a rotational transport body 104 is a receiving drum 104. The receiving drum 104, however, is preferably an integral part of the sheet feed device 100.

Preferably all rotational transport bodies 708; 709; 711; 712; 713 of the respective base module 704, and more preferably all rotational transport bodies 708; 709; 711; 712; 713 of the printing unit 700 designed, in particular, as a screen printing unit 700, have a single circumference, that is, are designed to receive one sheet 02 around the circumference.

The four installation areas 726; 727; 728; 729 are preferably arranged in such a way that these and/or the respective rotational bodies 708; 709; 711; 712; 713 arranged therein together define a section, assigned to the respective base module 704, of the transport path provided for the transport of substrate 02. The first installation area 726, viewed along the transport path provided for the transport of substrate 02, is referred to as the first installation area 726 of the respective base module 704. The rotational transport body 708; 709; 711; 712; 713 that is arranged in the first installation area 726 is referred to as the first rotational transport body 708; 709; 711; 712; 713 of the respective base module 704. The second installation area 727, viewed along the transport path provided for the transport of substrate 02, is referred to as the second installation area 727 of the respective base module 704. The rotational transport body 708; 709; 711; 712; 713 that is arranged in the second installation area 727 is referred to as the second rotational transport body 708; 709; 711; 712; 713 of the respective base module 704. The third installation area 728, viewed along the transport path provided for the transport of substrate 02, is referred to as the third installation area 728 of the respective base module 704. The rotational transport body 708; 709; 711; 712; 713 that is arranged in the third installation area 728 is referred to as the third rotational transport body 708; 709; 711; 712; 713 of the respective base module 704. The fourth installation area 729, viewed along the transport path provided for the transport of substrate 02, is referred to as the fourth installation area 729 of the respective base module 704. The rotational transport body 708; 709; 711; 712; 713 that is arranged in the fourth installation area 727 is referred to as the fourth rotational transport body 708; 709; 711; 712; 713 of the respective base module 704.

A through-plane E of the respective base module 704 is defined as the plane E that completely includes both the axis of rotation 716; 717; 718; 719 of the first rotational transport body 708; 709; 711; 712; 713 of this particular base module 704 and the axis of rotation 716; 717; 718; 719 of the fourth rotational transport body 708; 709; 711; 712; 713 of this particular base module 704. This through-plane E divides the space into two hemispheres. The axis of rotation 716; 717; 718; 719 of the second rotational transport body 708; 709; 711; 712; 713 of this particular base module 704 is preferably completely situated in the one of these two hemispheres, and the axis of rotation 716; 717; 718; 719 of the third rotational transport body 708; 709; 711; 712; 713 of this particular base module 704 is preferably completely situated in the other of these two hemispheres. The through-plane E preferably has a normal vector N which deviates from a vertical direction V by no more than 45°, more preferably by no more than 20°, and still more preferably by no more than 10°. Still more preferably, the normal vector N extends in the vertical direction V. The axis of rotation 716; 717; 718; 719 of the second rotational transport body 708; 709; 711; 712; 713 is preferably arranged lower than the axis of rotation 716; 717; 718; 719 of the third rotational transport body 708; 709; 711; 712; 713, and more preferably also lower than the axis of rotation 716; 717; 718; 719 of the first rotational transport body 708; 709; 711; 712; 713 and the axis of rotation 716; 717; 718; 719 of the fourth rotational transport body 708; 709; 711; 712; 713. The axis of rotation 716; 717; 718; 719 of the third rotational transport body 708; 709; 711; 712; 713 is preferably arranged higher than the axis of rotation 716; 717; 718; 719 of the second rotational transport body 708; 709; 711; 712; 713, and more preferably also higher than the axis of rotation 716; 717; 718; 719 of the first rotational transport body 708; 709; 711; 712; 713 and the axis of rotation 716; 717; 718; 719 of the fourth rotational transport body 708; 709; 711; 712; 713.

A transport angle W726; W727; W728; W729 of a rotational transport body is preferably the angular range about the axis of rotation of this rotational transport body in which sheets 02 are transported by means of this rotational transport body.

A transport angle W726 of the first rotational transport body 708; 709; 711; 712; 713 or of the first installation area 726 of the respective base module 704 is preferably more than 180°. For example, the transport angle W726 of this first rotational transport body 708; 709; 711; 712; 713 or of this first installation area 726 is at least 190°, still more preferably at least 195°. The transport angle W726 of this first rotational transport body 708; 709; 711; 712; 713 is preferably no more than 240°, more preferably no more than 220°, still more preferably no more than 205°, and still more preferably no more than 201°.

A transport angle W727 of the second rotational transport body 708; 709; 711; 712; 713 or of this second installation area 727 of the respective base module 704 is preferably more than 180°. For example, the transport angle W727 of this second rotational transport body 708; 709; 711; 712; 713 or of this second installation area 727 is at least 200°, still more preferably at least 220°, and still more preferably at least 240°. The transport angle W727 of this second rotational transport body 708; 709; 711; 712; 713 or of this second installation area 727 is preferably no more than 300°, more preferably no more than 270°, still more preferably no more than 250°, and still more preferably no more than 245°.

A transport angle W728 of the third rotational transport body 708; 709; 711; 712; 713 or of the third installation area 728 of the respective base module 704 is preferably more than 180°. For example, the transport angle W728 of this third rotational transport body 708; 709; 711; 712; 713 or of this third installation area 728 is at least 200°, still more preferably at least 220°, and still more preferably at least 240°. The transport angle W728 of this third rotational transport body 708; 709; 711; 712; 713 or of this third installation area 728 is preferably no more than 300°, more preferably no more than 270°, still more preferably no more than 250°, and still more preferably no more than 245°. The transport angle W728 of this third rotational transport body 708; 709; 711; 712; 713 or of this third installation area 728 is preferably as large as the transport angle W727 of the second rotational transport body 708; 709; 711; 712; 713 or of the third installation area 727.

A transport angle W729 of the fourth rotational transport body 708; 709; 711; 712; 713 or of the fourth installation area 729 of the respective base module 704 is preferably more than 180°. For example, the transport angle W729 of this fourth rotational transport body 708; 709; 711; 712; 713 or of this fourth installation area 729 is at least 190°, still more preferably at least 195°. The transport angle W729 of this fourth rotational transport body 708; 709; 711; 712; 713 or of this fourth installation area 729 is preferably no more than 240°, more preferably no more than 220°, still more preferably no more than 205°, and still more preferably no more than 201°. The transport angle W729 of this fourth rotational transport body 708; 709; 711; 712; 713 or of this fourth installation area 729 is preferably as large as the transport angle W726 of the first rotational transport body 708; 709; 711; 712; 713 or of the first installation area 726.

The printing unit 700 designed, in particular, as a screen printing unit 700 is preferably designed to print substrate 02, in particular sheets 02, by means of at least one printing forme 751 that is preferably designed as a cylindrical screen 751, in particular a screen printing forme 751. This printing forme 751 preferably comprises a multiplicity of, in particular like and/or identical, image-producing elements, for example, print image motifs, or, in particular like and/or identical, groups of image-producing print motifs around the circumference which, on a circumferential length corresponding to the print image length, are arranged, for example, in a matrix-like manner in several columns, which are equidistantly spaced apart from one another transversely to the transport direction T, and on a cylinder width corresponding to the print image width are arranged in several rows, which are equidistantly spaced apart from one another in the transport direction T. These elements or print motifs are preferably embodied in the form of screen printing stencils. The printing unit 700 designed, in particular, as a screen printing unit 700 preferably comprises a forme cylinder 752 designed, in particular, as a screen printing forme cylinder 752. Preferably, a dedicated impression cylinder 708 is assigned to each such forme cylinder 752, in particular screen printing forme cylinder 752. A respective screen printing forme cylinder 752 carries such a cylindrical screen 751 and/or comprises such a cylindrical screen 751.

The screen printing forme cylinder 752 is arranged rotatably about an axis of rotation 753. A respective screen printing forme cylinder 752 is also a rotational body 752. A screen printing device 754 preferably additionally comprises at least one squeegee device 757. The squeegee device 757 cooperates with the cylindrical screen 751 in the known manner for applying printing ink through openings in the cylindrical screen 751 onto a respective sheet 02, as this respective sheet 02 is being transported while held by the impression cylinder 708. The impression cylinder 708 and the forme cylinder 752 designed, in particular, as a screen printing forme cylinder 752 together form a printing nip 758, which is in particular designed as a screen printing nip 758.

The printing unit 700 designed, in particular, as a screen printing unit 700 comprises, for example, at least one transfer drum 711. A respective transfer drum 711 conventionally comprises at least one gripper device for conveying the sheets. The respective transfer drum 711 preferably comprises at least one main body. The at least one gripper device comprises fixing elements for receiving and fixing the sheets 02. The fixing elements are preferably movably arranged at the main body and/or movable jointly therewith. Preferably, grippers, in particular clamping and/or suction grippers for gripping the sheet edges, are provided as fixing elements. The respective transfer drum 711, and in particular the main body thereof and/or the at least one gripper device thereof, are arranged so as to be rotatable about an axis of rotation 718.

The transfer drum 711, for example, but not necessarily, comprises a supporting surface for sheets 02. The at least one gripper preferably comprises at least one movable gripper finger, which is arranged so as to be movable relative to a main body of the transfer drum 711.

The printing unit 700 designed, in particular, as a screen printing unit 700 comprises, for example, at least one blower drum 712. A respective blower drum 712 conventionally comprises at least one gripper device for conveying the sheets. The respective blower drum 712 preferably comprises at least one main body. The at least one gripper device comprises fixing elements for receiving and fixing the sheets 02. The fixing elements are preferably movably arranged at the main body and/or movable jointly therewith. Preferably, grippers, in particular clamping and/or suction grippers for gripping the sheet edges, are provided as fixing elements. The respective blower drum 712, and in particular the at least one gripper device thereof and/or the main body thereof, are arranged so as to be rotatable about an axis of rotation 719. The at least one gripper preferably comprises at least one movable gripper finger, which is arranged so as to be movable relative to a main body of the blower drum 712.

The respective blower drum 712 preferably does not include a rotatable supporting surface for sheets 02. Preferably, at least one sheet guide device and at least one sheet blower device are provided. The at least one sheet guide device preferably has at least one inner surface, the shape of which corresponds to a section of a cylinder shell having an axis that is identical to the axis of rotation 719 of the blower drum 712. The at least one sheet blower device is used to generate a flow of gas that is directed from the inside against the inner surface of this sheet guide device. In this way, the corresponding sheet 02, while being held by the gripper device, can be transported onward about the axis of rotation 719, while the inwardly directed side thereof, apart from the contact surfaces of the fixing elements, does not come in contact with parts of the printing unit 700 designed, in particular, as a screen printing unit 700.

The respective blower drum 712 is preferably arranged, along the transport path provided for the transport of substrate 02, directly downstream from a respective impression cylinder 708, and/or directly upstream from a respective alignment cylinder 709. Sheets 02 can thus be transported from the impression cylinder 708 to the alignment cylinder 709 or from the alignment cylinder 709 to a further alignment cylinder 709, without a freshly printed sheet surface coming in contact with an object and the applied print image possibly becoming damaged thereby.

Preferably, at least one pre-alignment device 767 is provided, for example in the region of a blower drum 712 and/or of a suction drum 713 and/or of a transfer drum 711. This at least one pre-alignment device 767 is preferably an integral part of a respective alignment device 771. This at least one pre-alignment device 767 is preferably arranged so as to be stationary during printing operation. This at least one pre-alignment device 767 is preferably assigned to a respective blower drum 712 and/or suction drum 713 and/or transfer drum 711, which more preferably is assigned to a respective downstream alignment cylinder 709. The pre-alignment device 767 is preferably designed so as to extend over an exposure angle about the axis of rotation 719 of the blower drum 712 and/or suction drum 713 and/or transfer drum 711. The pre-alignment device 767 preferably comprises at least one, and more preferably several solenoids and/or permanent magnets.

The printing unit 700 designed, in particular, as a screen printing unit 700 comprises, for example, at least one suction drum 713. A respective suction drum 713 conventionally comprises at least one gripper device for conveying the sheets. The respective suction drum 713 preferably comprises at least one main body. The at least one gripper device comprises fixing elements for receiving and fixing the sheets 02. The fixing elements are preferably movably arranged at the main body and/or movable jointly therewith. Preferably, grippers, in particular clamping and/or suction grippers for gripping the sheet edges, are provided as fixing elements. The respective suction drum 713, and in particular the main body thereof and/or the at least one gripper device thereof, are rotatably arranged about an axis of rotation. The suction drum 713 preferably comprises a supporting surface for sheets 02. The at least one gripper preferably comprises at least one movable gripper finger, which is arranged so as to be movable relative to a main body of the suction drum 713 and/or the supporting surface of the suction drum 713.

The supporting surface of the suction drum 713 preferably has suction openings, in particular for taking in ambient air and/or applying suction to sheets 02. When a sheet 02 is arranged on the supporting surface of the suction drum 713, the leading edge thereof is preferably held by grippers. As an alternative or in addition, the sheet 02 is only held by the suction openings on the supporting surface. Preferably, at least one inspection device 402; 403 is provided, more preferably it is aligned with a supporting surface of a rotational transport body 407 designed as a suction drum 713. As a result of suction being applied to the respective sheet 02, the position thereof on the suction drum 713 is especially stable. This makes it possible, for example, to carry out an inspection with particularly high precision. In an advantageous refinement, especially in conjunction with a delivery device 900 comprising several pile spaces, the at least one inspection device 402; 403 is arranged downstream from a last alignment device 771, along the transport path provided for the transport of substrate 02. This at least one inspection device 402; 403 operates, for example, by way of an incident light method and, preferably in addition to a light source that is directed at the transport path provided for the transport of substrate 02, comprises a camera that is directed at the impingement point thereof for the transport path provided for the transport of substrate 02. Sheets 02 deemed to be defective or to have a faulty print image can then be collected on one of the piles, while so-called good sheets are deposited onto a different pile.

As described, the printing unit 700 designed, in particular, as a screen printing unit 700 preferably comprises at least one alignment cylinder 709, which is in particular designed as a rotational transport body 709. The respective alignment cylinder 709 is preferably designed as a magnetically active alignment cylinder 709. Preferably, sheets 02 are transported by means of the respective alignment cylinder 709, and in the process the magnetic particles of the coating agent, which was previously applied and has not yet dried, are oriented in keeping with a pattern of magnetic field lines proceeding from the respective alignment cylinder 709. In the region of the outer circumference, the respective alignment cylinder 709 preferably comprises a plurality of elements inducing a magnetic field, magnetic elements for short, which are used, in particular, to orient at least some of the magnetic or magnetizable particles of the coating agent that is applied to the respective passing sheet 02. The magnetic elements can be formed by permanent magnets with or without engraving, by solenoids, or by combinations of one or more permanent magnets and/or one or more solenoids. These can be removable and/or rotatable about a radially extending axis and/or be arranged on a cylinder main body so as to be adjustable, individually or in groups, with respect to the axial and/or circumferential positions thereof, and together therewith can form the respective alignment cylinder 709. For the case of the aforementioned plurality of multiple-up copies per sheet 02, several, for example, at least four, rows of in each case several, for example, three to eight, in particular four to seven, magnetic elements that are spaced apart from one another transversely to the transport direction T, are provided or can be provided on the circumference, for example, in a matrix-like manner. By conveying the sheets 02 over the respective alignment cylinder 709, the particles are aligned or oriented by means of the magnetic field lines caused by the magnetic elements, possibly also through the particular sheet 02.

The magnetic elements can be arranged or arrangeable in or at several, for example, three to eight, in particular in four to seven, ring elements that can be axially spaced apart from one another and preferably be positioned in the axial direction A, wherein in or at these ring elements, in turn, in each case at least one, preferably several, for example, between two and twelve, advantageously between five and ten, magnetic elements are arranged or can be arranged one behind the other in the circumferential direction and preferably positionable in the circumferential direction. For example, the at least one alignment cylinder 709 comprises at least one suction device, by means of which a respective sheet 02 can be held on the alignment cylinder 709.

The respective alignment cylinder 709 is preferably mounted between frame side walls 702; 703 of the printing unit 700 designed, in particular, as a screen printing unit 700 so as to be removable, in particular without removing one of the frame side walls 702; 703, for a replacement or for carrying out makeready work. This, however, shall be understood to mean a "planned" or "routine" removal or reinsertion, different from a dismantling or disassembly of the relevant module. For this purpose, for example at least on the drive side, a rotationally fixed, detachable connection is provided between the alignment cylinder 709 or cylinder journal and a following drive shaft, the disconnection point of which is situated within the inside width between the frame side walls 702; 703.

Preferably, at least one outer magnetic device 774 is provided, which is in particular designed as a simultaneous magnetic device 774. This at least one outer magnetic device 774 is preferably arranged so as to be stationary at least during printing. This at least one outer magnetic device 774 is preferably assigned to a respective alignment cylinder 709. This at least one outer magnetic device 774 is preferably an integral part of an alignment device 771, in particular the alignment device 771 of which the assigned alignment cylinder 709 is also part. The outer magnetic device 774 is preferably designed so as to extend over an exposure angle about the assigned alignment cylinder 709. The outer magnetic device 774 preferably comprises at least one, and more preferably several solenoids and/or permanent magnets, and preferably cooperates with the magnetic devices of the respective alignment cylinder 709.

In an alternative or additional refinement, the printing unit 700 designed, in particular, as a screen printing unit 700 is preferably characterized by comprising at least one screen printing forme cylinder 752 forming, together with an impression cylinder 708, a screen printing nip 758, and that along the transport path provided for the transport of substrate 02, downstream from the impression cylinder 708, at least one alignment cylinder 709 is arranged, which in the region of the outer circumference thereof comprises a plurality of elements that induce a magnetic field.

The printing unit 700 is designed, for example, as a sheet-fed printing unit 700. The printing unit 700 preferably comprises at least a first tool-dependent printing nip 758, which is formed by a pair of cooperating rotational bodies 708; 752. The term of the "first printing nip" shall preferably only be understood to serve a distinguishing purpose and not relate to an order in which the sheets pass through the printing unit 700. The printing unit 700 preferably comprises at least a first alignment cylinder 709 along the transport path provided for the transport of substrate 02 downstream from the first tool-dependent printing nip 758, for example directly, preferably indirectly downstream from this first tool-dependent printing nip 758. The printing unit 700 preferably comprises at least a first non-impact printing position 787 along the transport path provided for the transport of substrate 02 downstream from the first tool-dependent printing nip 758, to which at least a first print head 791 is assigned. The printing unit 700 preferably comprises at least a first curing device 772, having a first curing area 788 assigned thereto, along the transport path provided for the transport of substrate 02 downstream from the first non-impact printing position 787.

In an alternative or additional refinement, the printing unit 700 is preferably characterized in that, in the region of the first non-impact printing position 787, the transport path provided for the transport of substrate 02 is defined by the first alignment cylinder 709 or a rotational transport body 711; 712; 713 that is arranged directly upstream from the first alignment cylinder 709, for example a transfer drum 711 and/or a blower drum 712 and/or a suction drum 713 and/or a rotational transport body 711; 712; 713 operating in a contactless manner, with the exception of gripper contacts.

In an alternative or additional refinement, the printing unit 700 is preferably characterized in that, in the first curing area 788 of the at least one first curing device 772, the transport path provided for the transport of substrate 02 is defined by the first alignment cylinder 709 or a rotational transport body 711; 712; 713 that is arranged directly downstream from the first alignment cylinder 709, for example a transfer drum 711 and/or a blower drum 712 and/or a suction drum 713 and/or a rotational transport body 711; 712; 713 operating in a contactless manner, with the exception of gripper contacts.

In an alternative or additional refinement, the printing unit 700 is preferably characterized in that an in particular colorless additive is situated in a supply reservoir 789 which, in terms of conduction, is connected to the at least one first print head 791. The additive is designed, for example, as an additive for changing curing properties of the applied material, wherein this applied material preferably represents a mixture of coating agent, in particular printing ink, and this additive. Such a change of curing properties is, for example, a creation or an enhancement of an in particular radiation-induced reactivity or curing reaction and/or of the speed thereof. Suitable radiation is designed, for example, as UV radiation and/or electron radiation. The additive is preferably a cross-linking agent. The coating agent that can be applied and/or is applied by means of the first tool-dependent printing nip 758 alone preferably does not have any radiation-inducible reactivity or curing reaction. In this way, the share of coating agent that is to be cured can be defined by means of the application in the non-impact printing position 787. As a result, it is also possible for an orientation, a selection of areas, a curing of the selected areas and thereafter again an orientation of previously uncured areas and a renewed selection of previously uncured areas and a renewed corresponding curing to take place several times in succession.

In an alternative or additional refinement, the printing unit 700 is preferably characterized in that the first tool-dependent printing nip 758 is designed as a screen printing nip 758. The first tool-dependent printing nip 758 is then formed, in particular, by cylinders 708; 752, one of which is a forme cylinder 752 and one is an impression cylinder 708 cooperating therewith. The forme cylinder 752 is preferably designed as a screen printing forme cylinder 752. As an alternative to a design as a screen printing nip 758, the first tool-dependent printing nip 758 can be designed as a flexographic printing nip or as a letterpress printing nip or as a rotogravure printing nip or as a planographic printing nip. Screen printing offers the advantage of relatively high layer thicknesses that can be applied. In the region of the tool-dependent printing nip 758, the transport path is preferably defined by the impression cylinder 708.

In an alternative or additional refinement, the printing unit 700 is preferably characterized in that a rotational transport body 711; 712; 713, which is arranged along the transport path provided for the transport of substrate 02 directly downstream from the impression cylinder 708 of the first tool-dependent printing nip 758, is designed as a transfer drum 711 and/or as a blower drum 712 and/or as a suction drum 713 or, generally speaking, as a low-smear or smear-free rotational transport body 711; 712; 713, and/or as a rotational transport body 711; 712; 713 operating in a contactless manner, with the exception of gripper contacts.

In an alternative or additional refinement, the printing unit 700 is preferably characterized in that the at least one first print head 791 is designed as an ink jet print head 791. The at least one ink jet print head 791 preferably comprises at least one piezo element or at least one thermocouple, in particular for ejecting drops of the additive. The at least one print head 791 preferably has a print resolution of at least 100 dpi, more preferably at least 200 dpi, still more preferably at least 300 dpi, still more preferably at least 600 dpi, still more preferably at least 1200 dpi, and still more preferably at least 2400 dpi. As usual, "dpi" denotes "dots per inch." In an alternative or additional refinement, at least one print head 791 is assigned to at least one non-impact printing position 787, for example, in such a way that the non-impact printing position 787, with respect to a rotational transport body 711; 712; 713 cooperating therewith, is located radially further to the outside than the at least one print head 791 itself. An inner side of a sheet 02 can then be printed, for example when the non-impact printing position 787 is assigned to a rotational transport body 711; 712; 713 which is arranged directly upstream from an alignment cylinder 709.

In an alternative or additional refinement, the printing unit 700 is preferably characterized in that the respective alignment cylinder 709, in the region of the outer circumference thereof, comprises a plurality of elements inducing an in particular respective magnetic field. These elements are also referred to as magnetic elements, for example, and are used, in particular, for orienting at least a portion of the magnetic or magnetizable particles of the coating agent that is applied to the respective passing substrate 02.

In an alternative or additional refinement, the printing unit 700 is preferably characterized in that the curing device 771 comprises at least one radiation source 792 for UV radiation and/or at least one electron beam source 792. Preferably, a wavelength or a wavelength range or an energy range in which the radiation source 792 for UV radiation and/or electron beam source 792 emits energy is matched to the additive situated in the supply reservoir 789.

In an alternative or additional refinement, the printing unit 700 is preferably characterized in that the printing unit 700, along the transport path provided for the transport of substrate 02, comprises at least one second alignment cylinder 709 downstream from the at least one first alignment cylinder 709 and preferably downstream from the first non-impact printing position 787 and/or the curing area 788 of the first curing device 772.

In an alternative or additional refinement, the printing unit 700 is preferably characterized in that the printing unit 700, along the transport path provided for the transport of substrate 02, downstream from the first alignment cylinder 709 comprises at least one second non-impact printing position 787, having at least one second print head 791 assigned thereto. In an alternative or additional refinement, the printing unit 700 is preferably characterized in that the printing unit 700, along the transport path provided for the transport of substrate 02, downstream from the second non-impact printing position 787 comprises at least one second curing device 772, having a second curing area 788 assigned thereto.

In an alternative or additional refinement, the printing unit 700 is preferably characterized in that, in the region of the second non-impact printing position 787, the transport path provided for the transport of substrate 02 is defined by the second alignment cylinder 709 or a rotational transport body 711; 712; 713 that is arranged directly upstream from the second alignment cylinder 709, for example a transfer drum 711 and/or a blower drum 712 and/or a suction drum 713 and/or a rotational transport body 711; 712; 713 operating in a contactless manner, with the exception of gripper contacts.

In an alternative or additional refinement, the printing unit 700 is preferably characterized in that, in the second curing area 788 of the at least one second curing device 772, the transport path provided for the transport of substrate 02 is defined by the second alignment cylinder 709 or a rotational transport body 711; 712; 713 that is arranged directly downstream from the second alignment cylinder 709, for example a transfer drum 711 and/or a blower drum 712 and/or a suction drum 713 and/or a rotational transport body 711; 712; 713 operating in a contactless manner, with the exception of gripper contacts.

In an alternative or additional refinement, the printing unit 700 is preferably characterized in that any tool-dependent printing nip 752 of the printing unit 700 is arranged upstream from the first non-impact printing position 787 and/or downstream from the second non-impact printing position 787. In other words, this means that preferably no tool-dependent printing nip 752 is arranged between the first non-impact printing position 787 and the second non-impact printing position 787.

In an alternative or additional refinement, the printing unit 700 is preferably characterized in that an in particular colorless additive is situated in a supply reservoir 789 which, in terms of conduction, is connected to the at least one second print head 791. The at least one second print head 791 is preferably designed as an ink jet print head 791. The additive is designed, for example, as an additive for changing curing properties of the applied material, wherein this applied material preferably represents a mixture of coating agent, in particular printing ink, and this additive. Such a change of curing properties is, for example, a creation or an enhancement of an in particular radiation-induced reactivity or curing reaction and/or of the speed thereof. Suitable radiation is designed, for example, as UV radiation and/or electron radiation. The additive is preferably a cross-linking agent.

In an alternative or additional refinement, the printing unit 700 designed, in particular, as a screen printing unit 700 is preferably characterized in that an alignment cylinder 709 is arranged in an installation area 726; 727; 728; 729 of a first base module 704, which in the region of the outer circumference thereof comprises a plurality of elements that induce a magnetic field, and/or that an alignment cylinder 709 is arranged in an installation area 726; 727; 728; 729 of a second base module 704, which in the region of the outer circumference thereof comprises a plurality of elements that induce a magnetic field. In an alternative or additional refinement, the printing unit 700 designed, in particular, as a screen printing unit 700 is preferably characterized in that a blower drum 712 is arranged in an installation area 726; 727; 728; 729 of the first base module 704 and/or that a blower drum 712 is arranged in an installation area 726; 727; 728; 729 of the second base module 704.

As described, the printing unit 700 preferably comprises at least one forme cylinder 752 and at least one impression cylinder 708 cooperating therewith. The printing unit 700 preferably comprises at least one frame 701, which comprises at least two frame side walls 702; 703 located opposite one another in a transverse direction A. The printing unit 700 preferably comprises at least one first base module 704 and at least one second base module 704, each base module 704 in each case comprising two stationary base side walls 706; 707, which each have a one-piece design and are each an integral part of a respective frame side wall 702; 703. The respective base module 704 in each case preferably includes four installation areas 726; 727; 728; 729 for rotational transport bodies 708; 709; 711; 712; 713, to which, more preferably, respective recesses 781; 782; 783; 784 in the supporting walls W1; W2 of the base side walls 706; 707 are assigned. The relative positions of the four installation areas 726; 727; 728; 729 of the first base module 704 with respect to one another preferably coincide with the relative positions of the four installation areas 726; 727; 728; 729 of the second base module 704. Preferably, the respective first installation area 726 along the transport path provided for the transport of substrate 02, in particular sheets 02, and the respective second installation area 727 of the respective base module 704 along this transport path form a respective selection group of the respective base module 704. Preferably, an impression cylinder 708 cooperating with a forme cylinder 752 preferably designed as a screen printing forme cylinder 752 and/or forming a first tool-dependent printing nip 758 is arranged in exactly one of the installation areas 726; 727 of the selection group of the first base module 704. Preferably, a respective rotational transport body 708; 709; 711; 712; 713 is arranged in each of the at least four installation areas 726; 727; 728; 729 of the two base modules 704.

In an alternative or additional refinement, the printing unit 700 designed in particular as a screen printing unit 700, is preferably characterized in that at least one print head 791 of the in particular first non-impact printing position 787 is arranged so as to be aligned with a rotational transport body 709; 711; 712; 713, which is arranged in an installation area 726; 727; 728; 729 of the first base module 704. In an alternative or additional refinement, the printing unit 700 designed, in particular, as a screen printing unit 700 is preferably characterized in that at least one print head 791 of a further non-impact printing position 787 is arranged so as to be aligned with a rotational transport body 709; 711; 712; 713 that is arranged in an installation area 726; 727; 728; 729 of the second base module 704.

In an alternative or additional refinement, the printing unit 700 is preferably characterized in that a functionally different rotational transport body 708; 709; 711; 712; 713 is arranged in at least one installation area 726; 727; 728; 729 of the first base module 704 than in a corresponding installation area 726; 727; 728; 729, in terms of the installation position, of the second base module 704.

In an alternative or additional refinement, the printing unit 700 is preferably characterized in that the impression cylinder 708 arranged in one of the installation areas 726; 727 of the selection group of the first base module 704 is arranged so as to form a screen printing nip 758 together with a screen printing forme cylinder 752 and/or that the impression cylinder 708 arranged in one of the installation areas 726; 727 of the selection group of the second base module 704 is arranged so as to form a screen printing nip 758 together with a screen printing forme cylinder 752.

In an alternative or additional refinement, the printing unit 700 is preferably characterized in that an impression cylinder 708 is arranged in a first installation area 726 of the first base module 704 along the transport path provided for the transport of substrate 02, and that a rotational transport body 711; 712; 713 designed as a transfer drum 711 and/or as a blower drum 712 and/or as a suction drum 713 and/or a rotational transport body operating in a contactless manner, with the exception of gripper contacts, is arranged in a second installation area 727 of the first base module 704 along the transport path provided for the transport of substrate 02, and that a rotational transport body 709 designed as a first alignment cylinder 709 is arranged in a third installation area 728 of the first base module 704 along the transport path provided for the transport of substrate 02, and that a rotational transport body 711; 712; 713 designed as a transfer drum 711 and/or as a blower drum 712 and/or as a suction drum 713 and/or a rotational transport body operating in a contactless manner, with the exception of gripper contacts, is arranged in a fourth installation area 729 of the first base module 704 along the transport path provided for the transport of substrate 02.

In an alternative or additional refinement, the printing unit 700 is preferably characterized in that the at least one print head 791 of the in particular first non-impact printing position 787 is arranged so as to be aligned with the rotational transport body 709; 711; 712; 713 in the second installation area 727 of the first base module 704 or the rotational transport body 709; 711; 712; 713 in the third installation area 728 of the first base module 704. In other words, this means that, in the region of the first non-impact printing position 787, the transport path provided for the transport of substrate 02 is defined by the first alignment cylinder 709 or a rotational transport body 711; 712; 713 arranged directly upstream from the first alignment cylinder 709.

In an alternative or additional refinement, the printing unit 700 is preferably characterized in that a first curing area 788 of a first curing device 772 is arranged so as to be aligned with the rotational transport body 709; 711; 712; 713 in the third installation area 728 of the first base module 704 or the rotational transport body 709; 711; 712; 713 in the fourth installation area 729 of the first base module 704. In other words, this means that, in the first curing area 788 of the at least one first curing device 772, the transport path provided for the transport of substrate 02 is defined by the first alignment cylinder 709 or a rotational transport body 711; 712; 713 arranged directly downstream from the first alignment cylinder 709.

In an alternative or additional refinement, the printing unit 700 is preferably characterized in that a rotational transport body 711; 712; 713 designed as a transfer drum 711 and/or as a blower drum 712 and/or as a suction drum 713 and/or a rotational transport body operating in a contactless manner, with the exception of gripper contacts, is arranged in a first installation area 726 of the first base module 704 along the transport path provided for the transport of substrate 02, and that an impression cylinder 708 is arranged in a second installation area 727 of the second base module 704 along the transport path provided for the transport of substrate 02, and that a rotational transport body 711; 712; 713 designed as a transfer drum 711 and/or as a blower drum 712 and/or as a suction drum 713 and/or a rotational transport body operating in a contactless manner, with the exception of gripper contacts, is arranged in a third installation area 728 of the second base module 704 along the transport path provided for the transport of substrate 02, and that a rotational transport body 709 designed as a further alignment cylinder 709 is arranged in a fourth installation area 729 of the second base module 704 along the transport path provided for the transport of substrate 02.

In an alternative or additional refinement, the printing unit 700 is preferably characterized in that the at least one print head 791 of the further non-impact printing position 787 is arranged so as to be aligned with the rotational transport body 709; 711; 712; 713 in the third installation area 728 of the second base module 704 or the rotational transport body 709; 711; 712; 713 in the fourth installation area 729 of the second base module 704. In other words, this means that, in the region of the further non-impact printing position 787, the transport path provided for the transport of substrate 02 is defined by the further alignment cylinder 709 or a rotational transport body 711; 712; 713 arranged directly upstream from the further alignment cylinder 709.

In an alternative or additional refinement, the printing unit 700 is preferably characterized in that a further curing area 788 of a further curing device 772 is arranged so as to be aligned with the rotational transport body 709; 711; 712; 713 in the fourth installation area 729 of the second base module 704 or a rotational transport body 709; 711; 712; 713 following the same outside the second base module 704. In other words, this means that, in the further curing area 788 of the at least one further curing device 772, the transport path provided for the transport of substrate 02 is defined by the further alignment cylinder 709 or a rotational transport body 711; 712; 713 arranged directly downstream from the further alignment cylinder 709.

In an alternative or additional refinement, the printing unit 700 is preferably characterized in that a rotational transport body 709 designed as a further alignment cylinder 709 is arranged in a first installation area 726 of the second base module 704 along the transport path provided for the transport of substrate 02. In an alternative or additional refinement, the printing unit 700 is preferably characterized in that the at least one print head 791 of the further non-impact printing position 787 is arranged so as to be aligned with the alignment cylinder 709 in the first installation area 726 of the second base module 704 or the rotational transport body 711; 712; 713 arranged upstream thereof. In other words, this means that, in the region of the further non-impact printing position 787, the transport path provided for the transport of substrate 02 is defined by the first alignment cylinder 709 or a rotational transport body 711; 712; 713 arranged directly upstream from the first alignment cylinder 709. In an alternative or additional refinement, the printing unit 700 is preferably characterized in that a further curing area 788 of a further curing device 772 is arranged so as to be aligned with the alignment cylinder 709 in the first installation area 726 of the second base module 704 or the rotational transport body 711; 712; 713 in the second installation area 727 of the second base module 704. In other words, this means that, in the further curing area 788 of the at least one further curing device 772, the transport path provided for the transport of substrate 02 is defined by the alignment cylinder 709 in the first installation area 726 of the second base module 704 or a rotational transport body 711; 712; 713 arranged directly downstream therefrom.

Generally speaking, the printing unit 700 can comprise combinations of tool-dependent printing nips 758 and non-impact printing positions 787 in a variety of ways. Preferably, at least one tool-dependent printing nip 758 is arranged at a forward point, based on the transport path provided for the transport of substrate 02, followed by one or more non-impact printing positions 787. One or more further tool-dependent printing nips 758 can be arranged between the subsequent non-impact printing positions 787, which can preferably be activated or deactivated as needed. For example, the printing unit 700 has at least one sequence comprising a tool-dependent printing nip 758 designed, in particular, as a screen printing nip 758, followed by a plurality of groupings, wherein each grouping comprises at least one non-impact printing position 787, an alignment device 771, and a curing device 772. The respective alignment device 771 preferably comprises at least one alignment cylinder 709 and more preferably also at least one pre-alignment device 767 and/or at least one simultaneous magnetic device 774. For example, the printing unit 700 has several such sequences.

In an alternative or additional refinement, different additives are assigned to different non-impact printing positions 787. These different additives differ, for example, in the manner in which they can be activated. For example, one of the additives can be activated by means of UV radiation in a first wavelength range and/or another additive can be activated by means of UV radiation in a second wavelength range differing therefrom and/or another additive can be activated by means of electron radiation.

Figure 1:
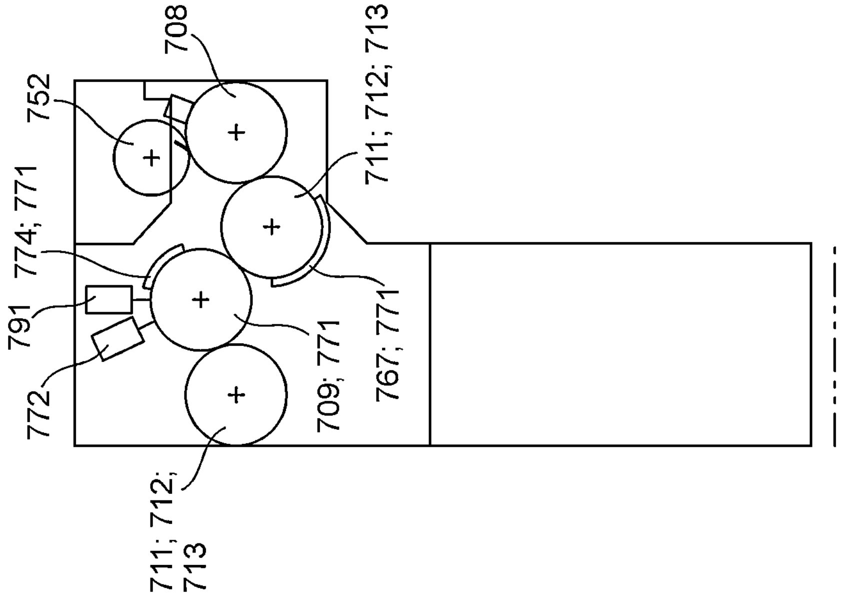
FIG. 1 a schematic representation of a printing unit comprising a tool-dependent printing nip, a non-impact printing position, an alignment device, and a curing device.
Figure 3:
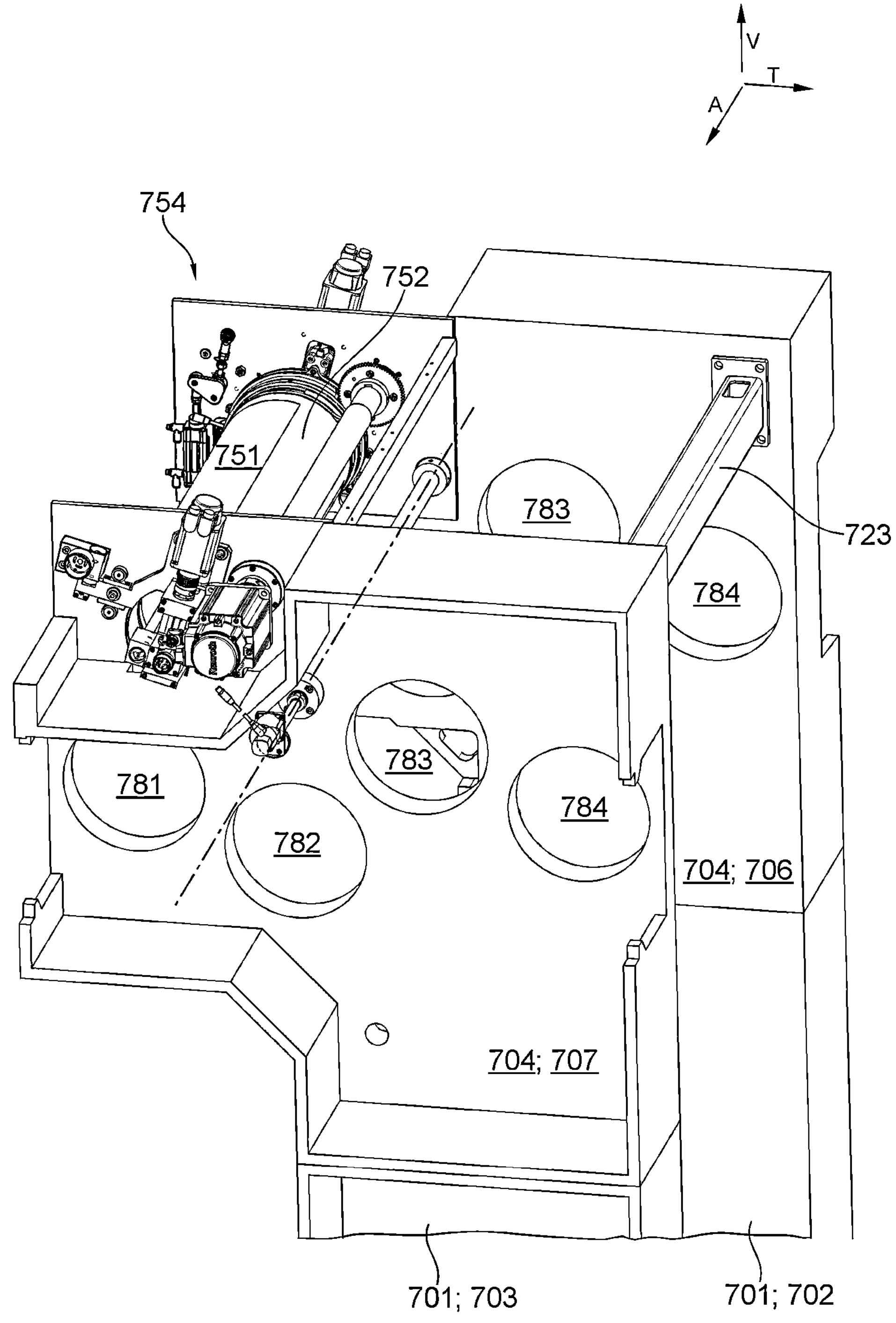
FIG. 3 a schematic representation of a part of a screen printing unit.
Figure 4:
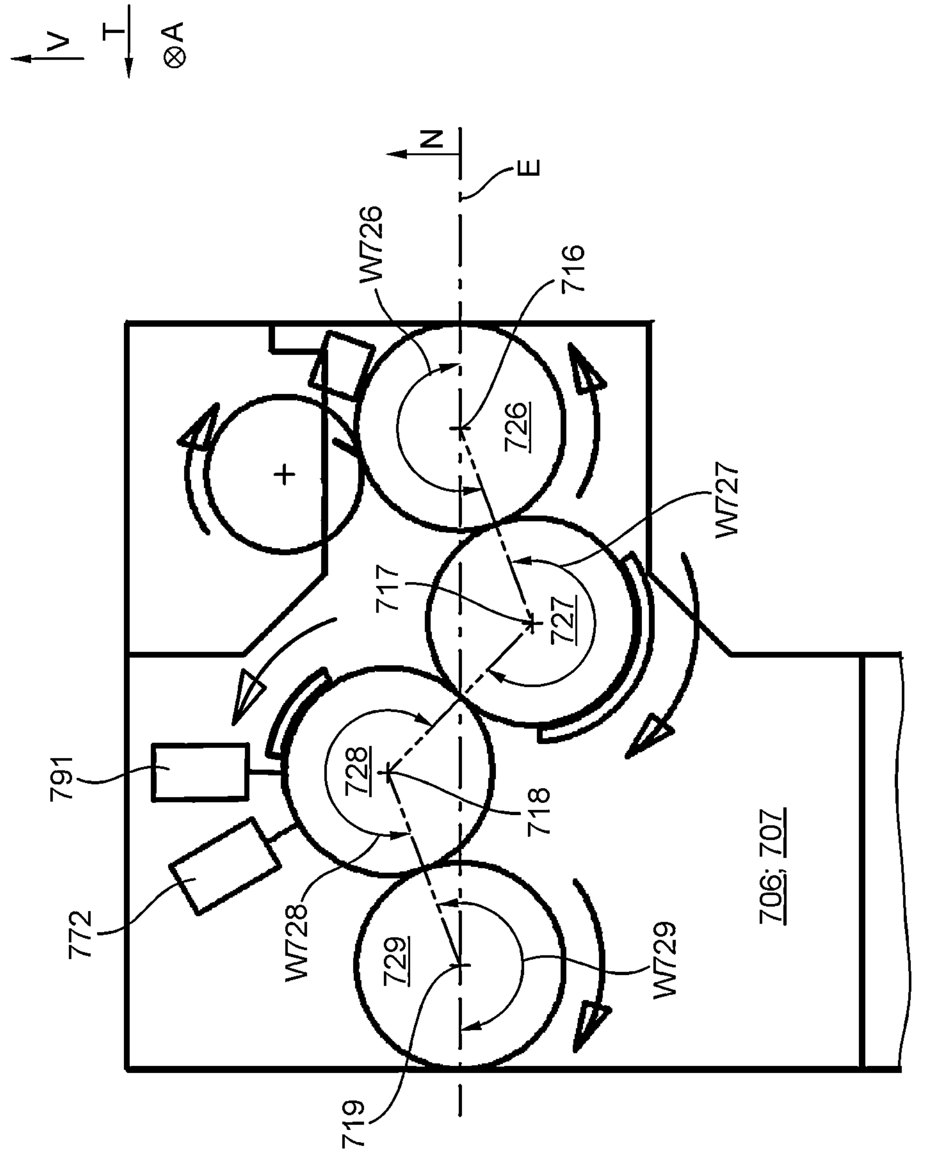
FIG. 4 a schematic representation of geometric conditions of a base module of a printing unit.

One example of a printing unit 700 comprises a tool-dependent printing nip 758, a non-impact printing position 787, as well as an alignment device 771 comprising an alignment cylinder 709, a pre-alignment device 767 and simultaneous magnetic device 774, and a curing device 772. For example, this printing unit 700 comprises a base module 704. (This is also shown by way of example in FIG. 1 or FIG. 2, wherein according to FIG. 1 a first side of a sheet 02 can be printed, and according to FIG. 2 another side of a sheet 02 can be printed). An arbitrary number of such base modules 704 can be combined.

Figure 5:
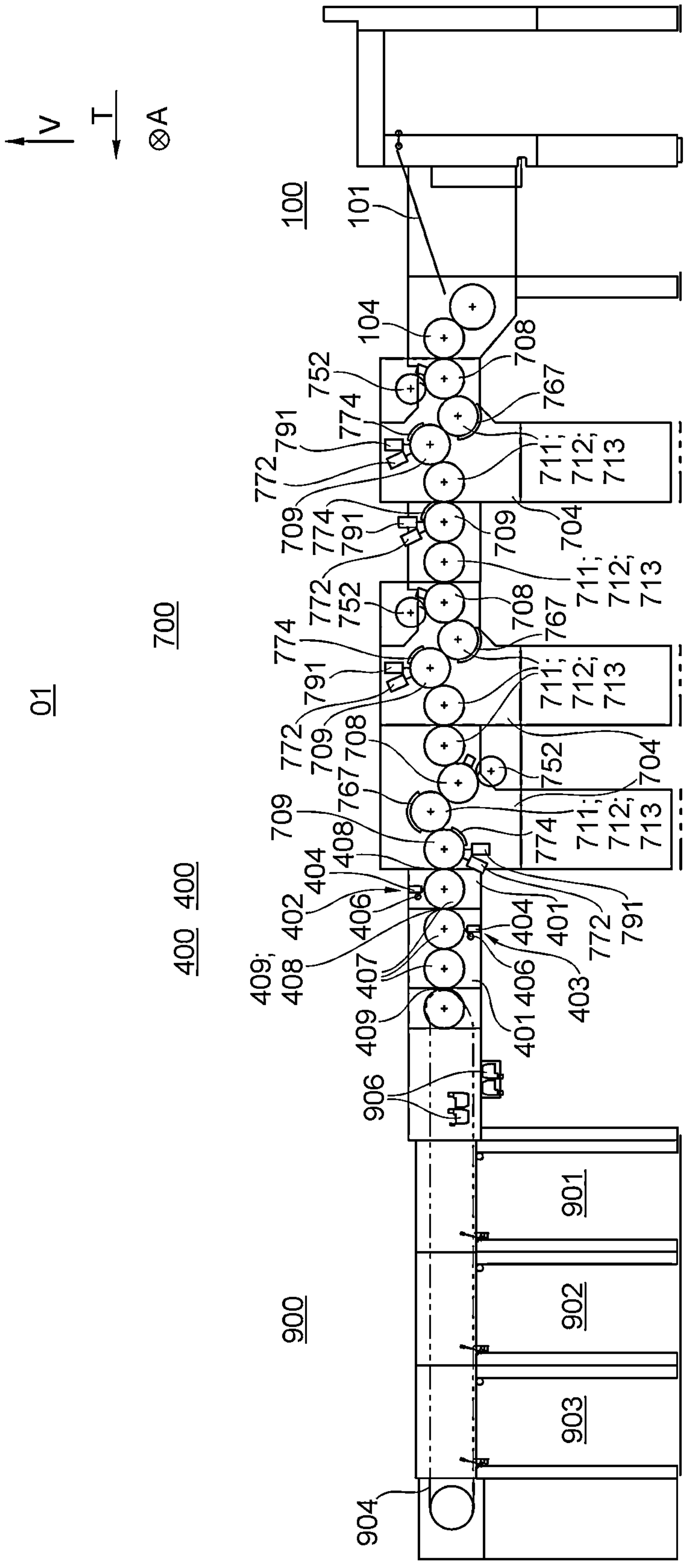
FIG. 5 a schematic representation of an exemplary printing machine comprising three tool-dependent printing nips, four non-impact printing positions, four alignment devices, and four curing devices, as well as a sheet feeder, a sheet delivery, and two inspection units.

One example of a printing unit 700 comprises three tool-dependent printing nips 758, two of which are assigned to one side of a printing substrate 02 and a further one is assigned to another side of the printing substrate 02. So as to form a printing machine 01, additionally four non-impact printing positions 787 as well as four alignment devices 771 and four curing devices 772 as well as a sheet feeder 100, a sheet delivery 900, and two inspection units 400 are provided. The alignment devices preferably comprise alignment cylinders 709, pre-alignment devices 767, and simultaneous magnetic devices 774. Three base modules 704 and one additional module 786 are provided and fitted accordingly. (This is also shown by way of example in FIG. 5).

Figure 6:
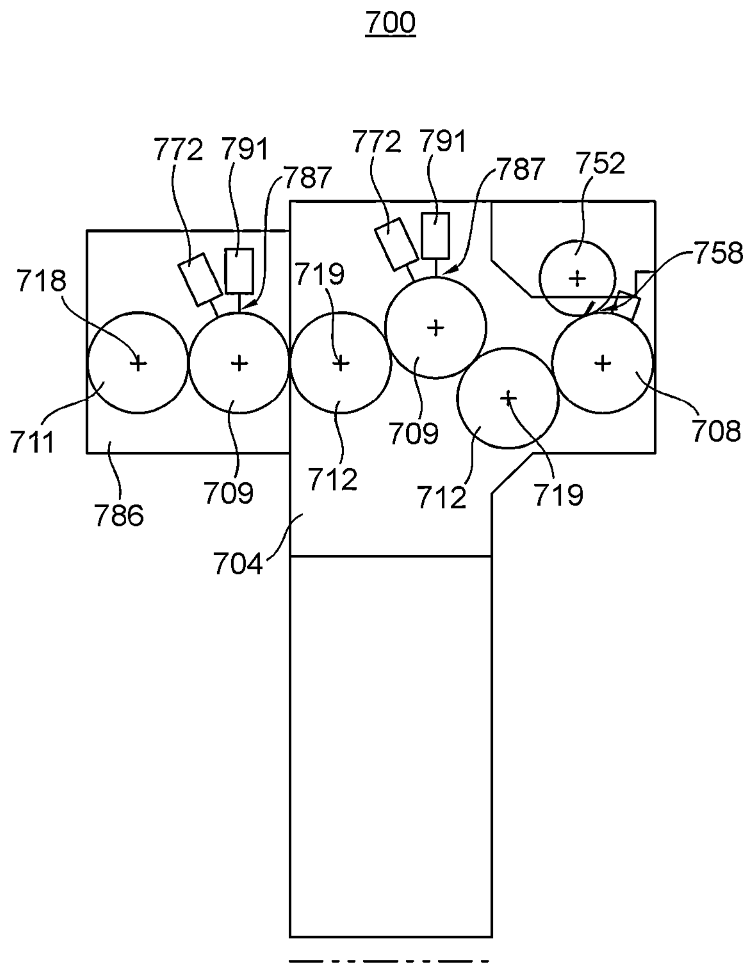
FIG. 6 a schematic representation of a base module carrying a tool-dependent printing nip and a non-impact printing position comprising an alignment device and a curing device, as well as an additional module carrying a non-impact printing position comprising an alignment device and a curing device.

One example of a printing unit 700 comprises a base module 704 and an additional module 786, wherein the base module 704 carries a tool-dependent printing nip 758 and a non-impact printing position 787 comprising an alignment device 771 and a curing device 772. The additional module 786 carries a non-impact printing position 787 comprising an alignment device 771 and a curing device 772. For example, the additional module 786 comprises a dedicated frame. (This is also shown by way of example in FIG. 6).

Figure 7:
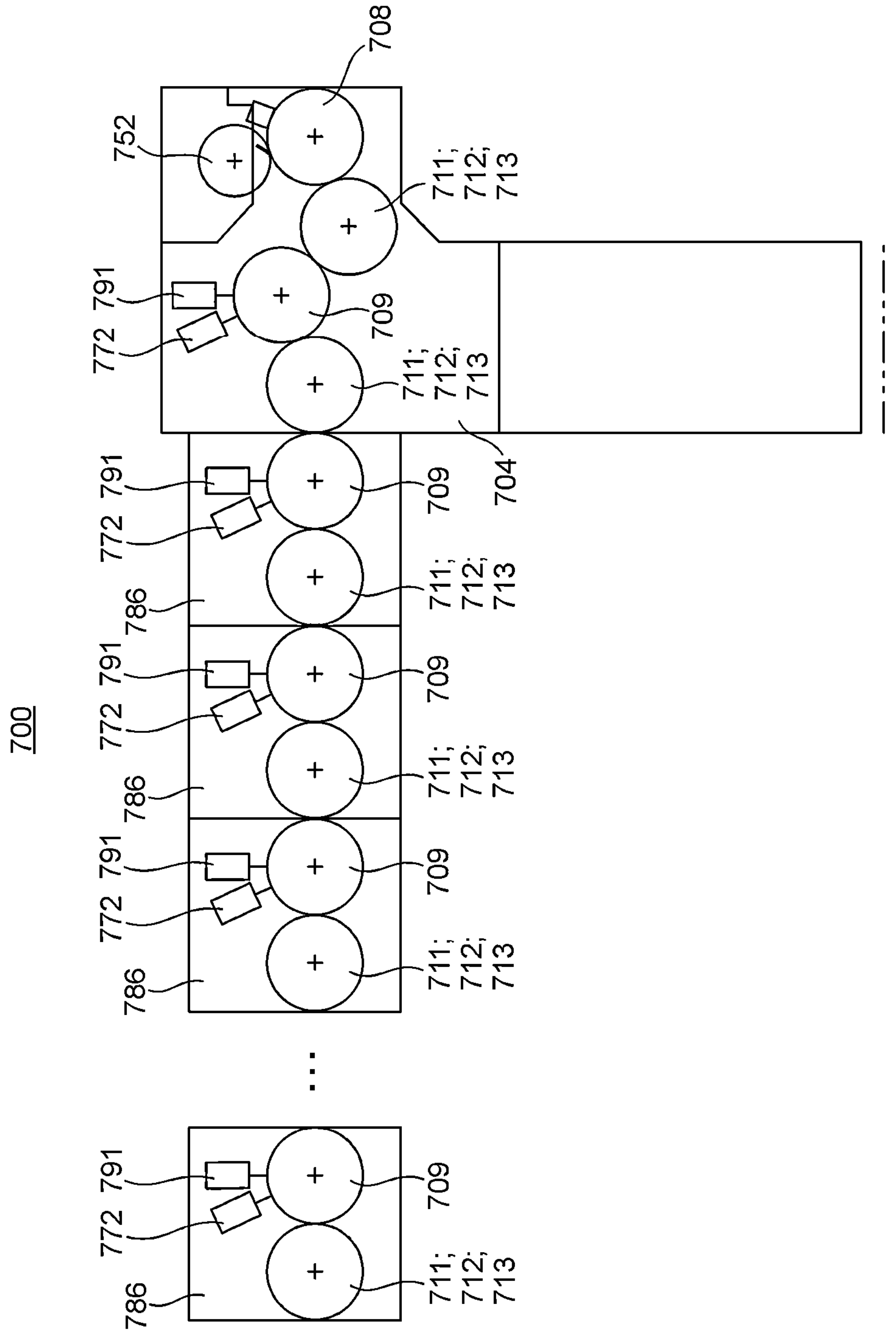
FIG. 7 a schematic representation according to FIG. 6, however comprising a number of at least four corresponding additional modules.

One example of a printing unit 700 comprises a base module 704 and several additional modules 786, wherein the base module 704 carries a tool-dependent printing nip 758 and a non-impact printing position 787 comprising an alignment device 771 and a curing device 772. Each of the additional modules 786 carries a non-impact printing position 787 comprising an alignment device 771 and a curing device 772. (This is also shown by way of example in FIG. 7).

Figure 8:
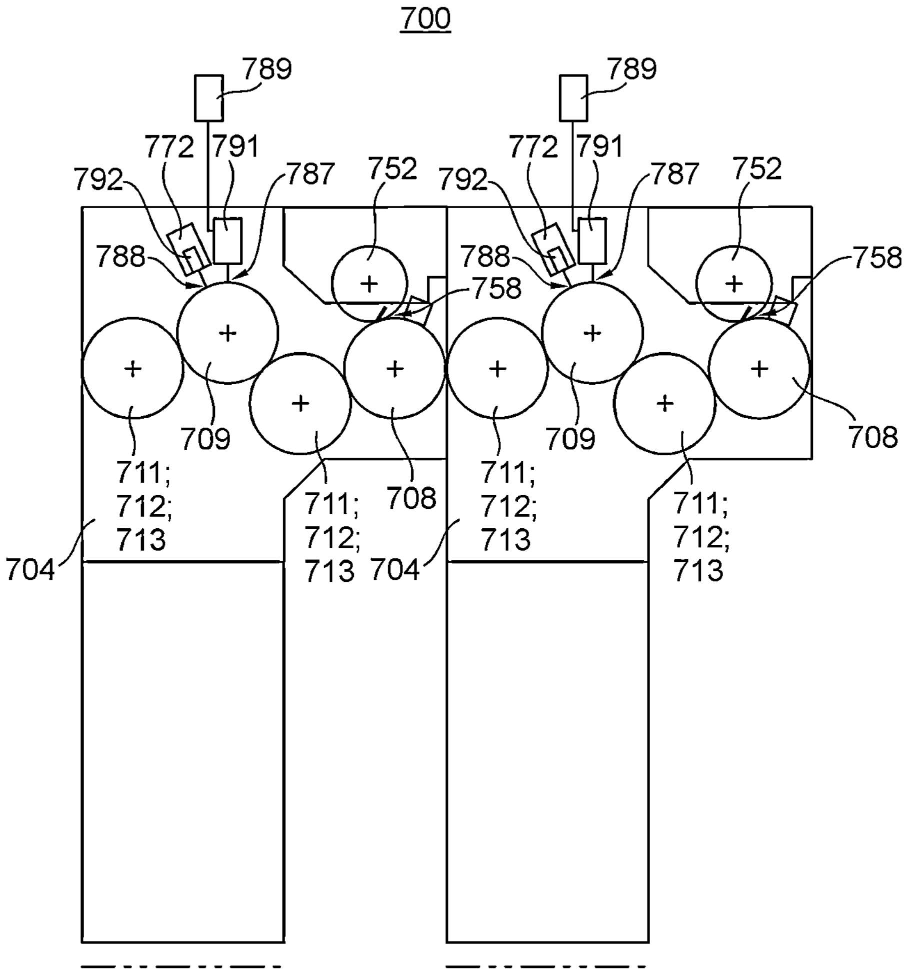
FIG. 8 a schematic representation of two base modules, which each carry a tool-dependent printing nip and a non-impact printing position comprising an alignment device and a curing device.

One example of a printing unit 700 comprises two base modules 704, which each carry a tool-dependent printing nip 758 and a non-impact printing position 787 comprising an alignment device 771 and a curing device 772. For example, the second tool-dependent printing nip 758 can be deactivated, in particular by lifting off the forme cylinder 752, so as to prevent coating agent that has not dried from being influenced thereby. (This is also shown by way of example in FIG. 8).

Figure 9:
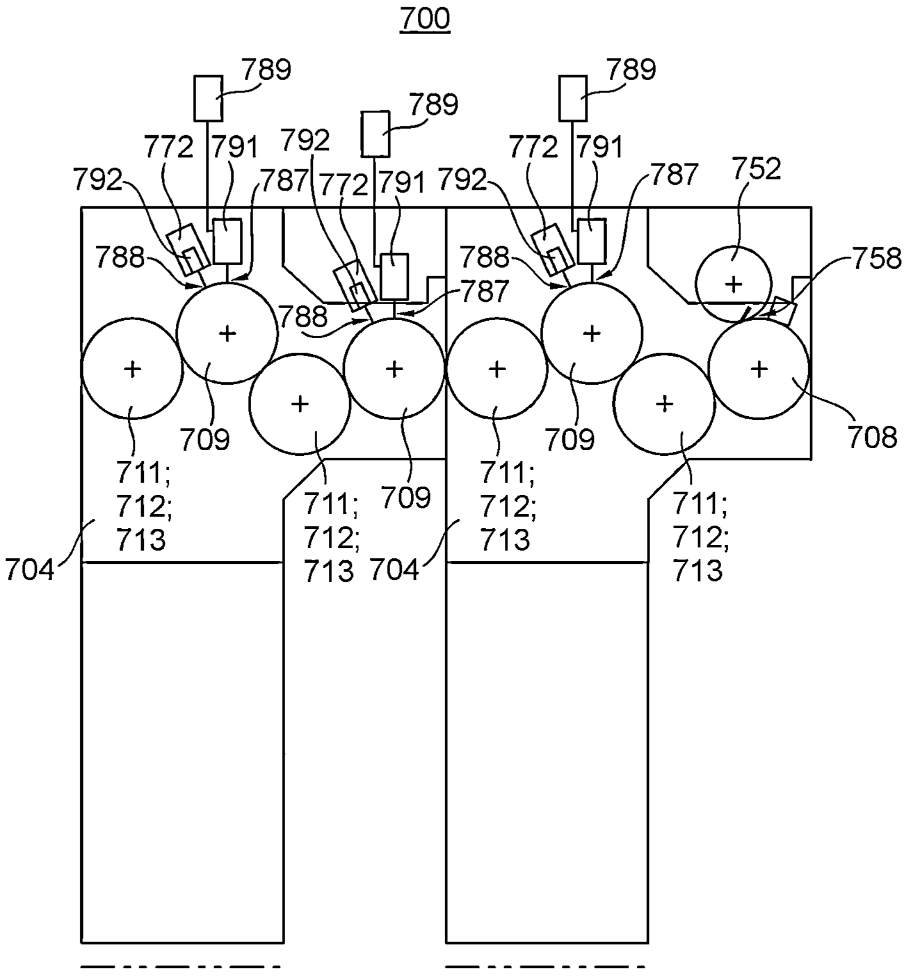
FIG. 9 a schematic representation of two base modules, one of which carries a tool-dependent printing nip and a non-impact printing position comprising an alignment device and a curing device, and another one of which carries two non-impact printing positions comprising an alignment device and a curing device.

One example of a printing unit 700 comprises two base modules 704. A first of these base modules 704 carries a tool-dependent printing nip 758 and a non-impact printing position 787 comprising an alignment device 771 and a curing device 772. A second of these base modules 704 carries two non-impact printing positions 787 comprising a respective alignment device 771 and a respective curing device 772. (This is also shown by way of example in FIG. 9).

Figure 10:
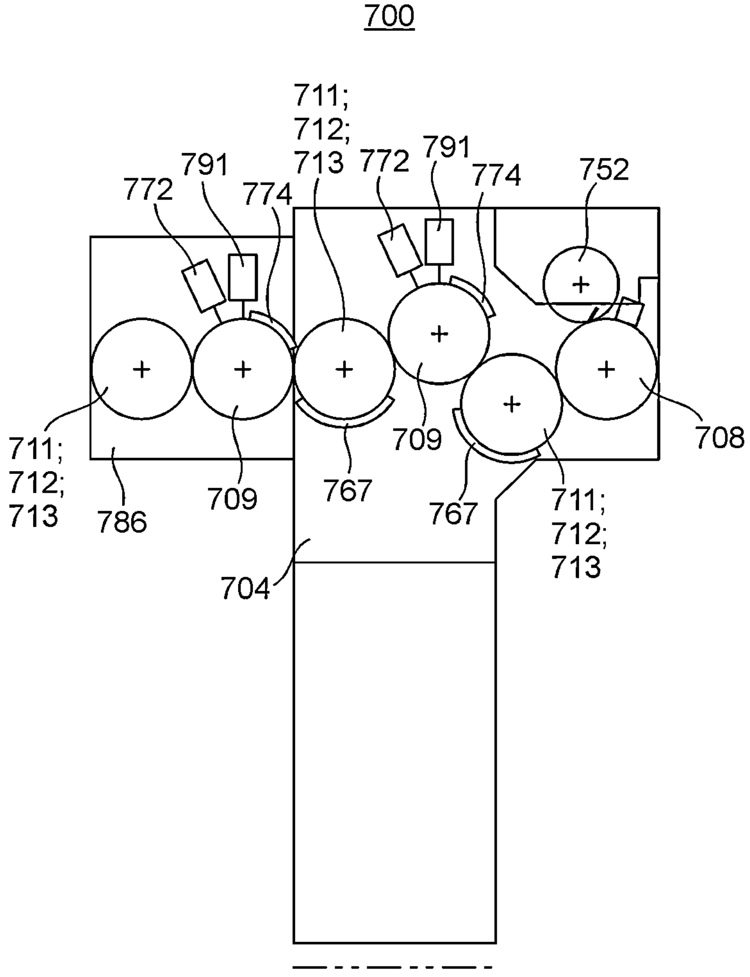
FIG. 10 a schematic representation according to FIG. 6, wherein additional pre-alignment devices and simultaneous magnetic devices are provided.

One example of a printing unit 700 comprises a base module 704 and an additional module 786, wherein the base module 704 carries a tool-dependent printing nip 758 and a non-impact printing position 787 comprising an alignment device 771 and a curing device 772. The additional module 786 carries a non-impact printing position 787 comprising an alignment device 771 and a curing device 772. Each alignment device 771 comprises an alignment cylinder 709, a pre-alignment device 767, and a simultaneous magnetic device 774. (This is also shown by way of example in FIG. 10).

Figure 11:
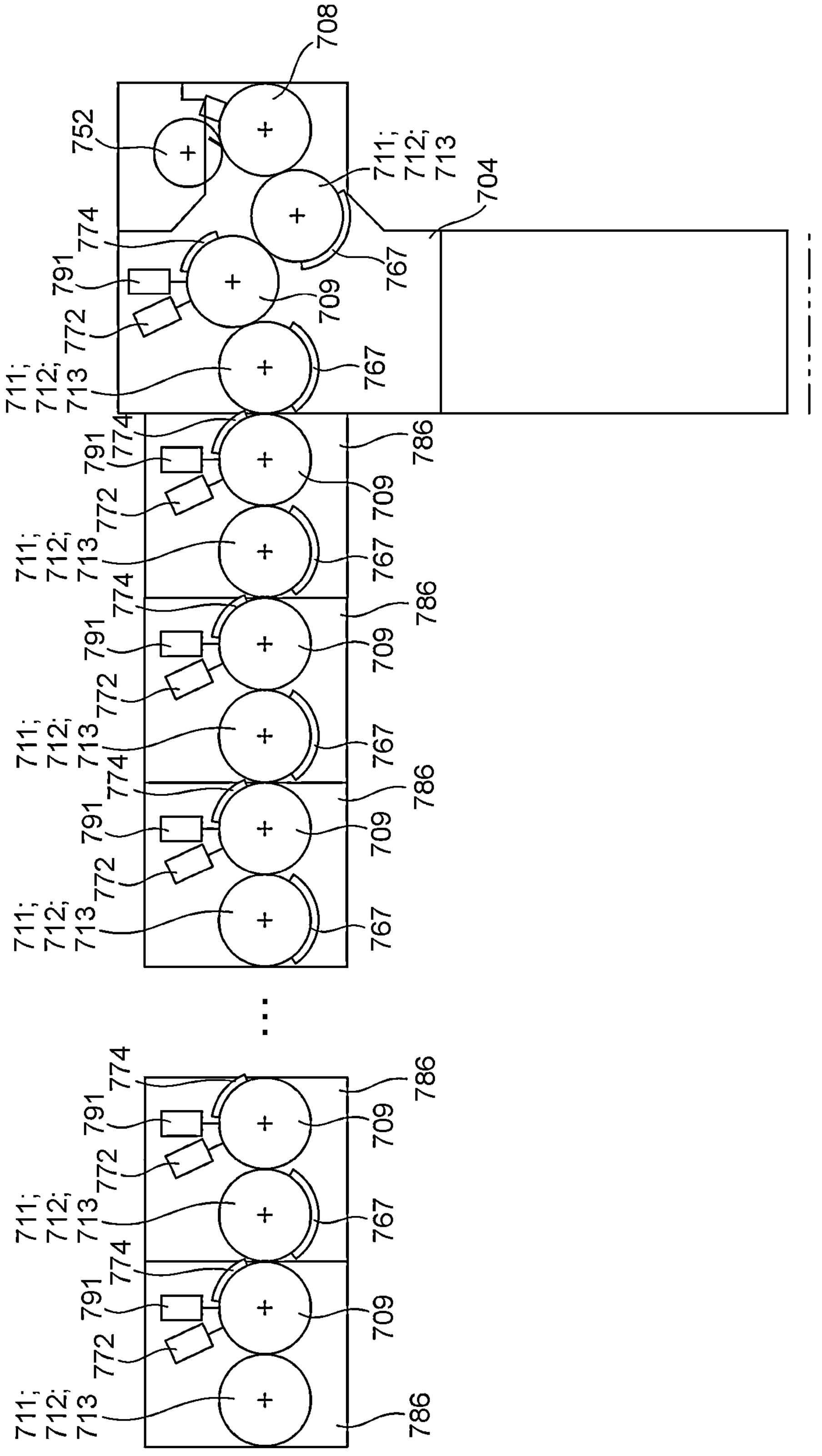
FIG. 11 a schematic representation according to FIG. 7, wherein additional pre-alignment devices and simultaneous magnetic devices are provided.

One example of a printing unit 700 comprises a base module 704 and several additional modules 786, wherein the base module 704 carries a tool-dependent printing nip 758 and a non-impact printing position 787 comprising an alignment device 771 and a curing device 772. Each of the additional modules 786 carries a non-impact printing position 787 comprising an alignment device 771 and a curing device 772. Each alignment device 771 comprises an alignment cylinder 709, a pre-alignment device 767, and a simultaneous magnetic device 774. (This is also shown by way of example in FIG. 11).

Figure 12:
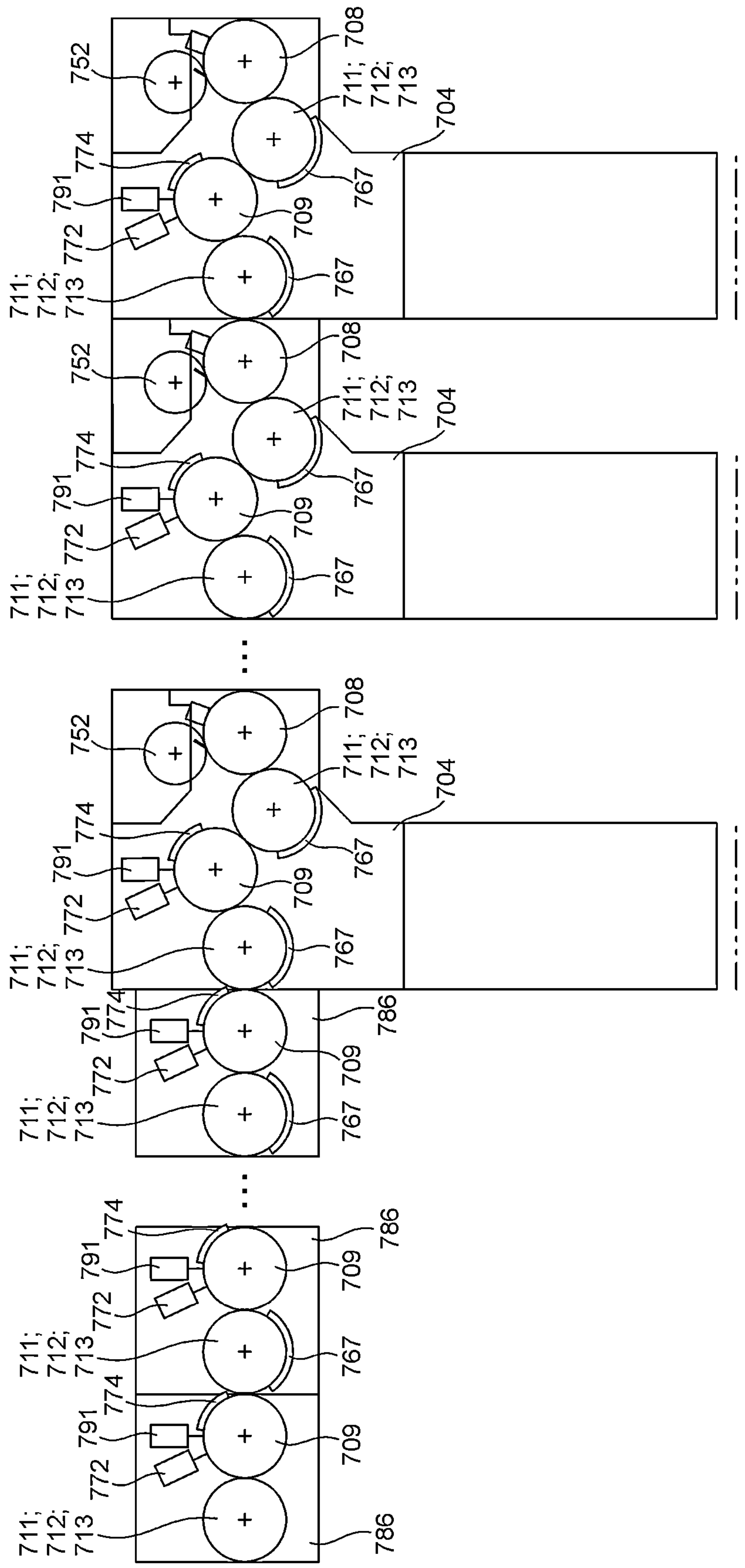
FIG. 12 a schematic representation of at least three base modules, which each carry a tool-dependent printing nip and a non-impact printing position comprising an alignment device, pre-alignment devices, simultaneous magnetic devices and a curing device, as well as at least three additional modules, which each carry a non-impact printing position comprising an alignment device, pre-alignment devices, simultaneous magnetic devices and a curing device.

One example of a printing unit 700 comprises several base modules 704 and several additional modules 786, wherein each of the base modules 704 carries a tool-dependent printing nip 758 and a non-impact printing position 787 comprising an alignment device 771 and a curing device 772. Each of the additional modules 786 carries a non-impact printing position 787 comprising an alignment device 771 and a curing device 772. Each alignment device 771 comprises an alignment cylinder 709, a pre-alignment device 767, and a simultaneous magnetic device 774. (This is also shown by way of example in FIG. 12).

Figure 13:
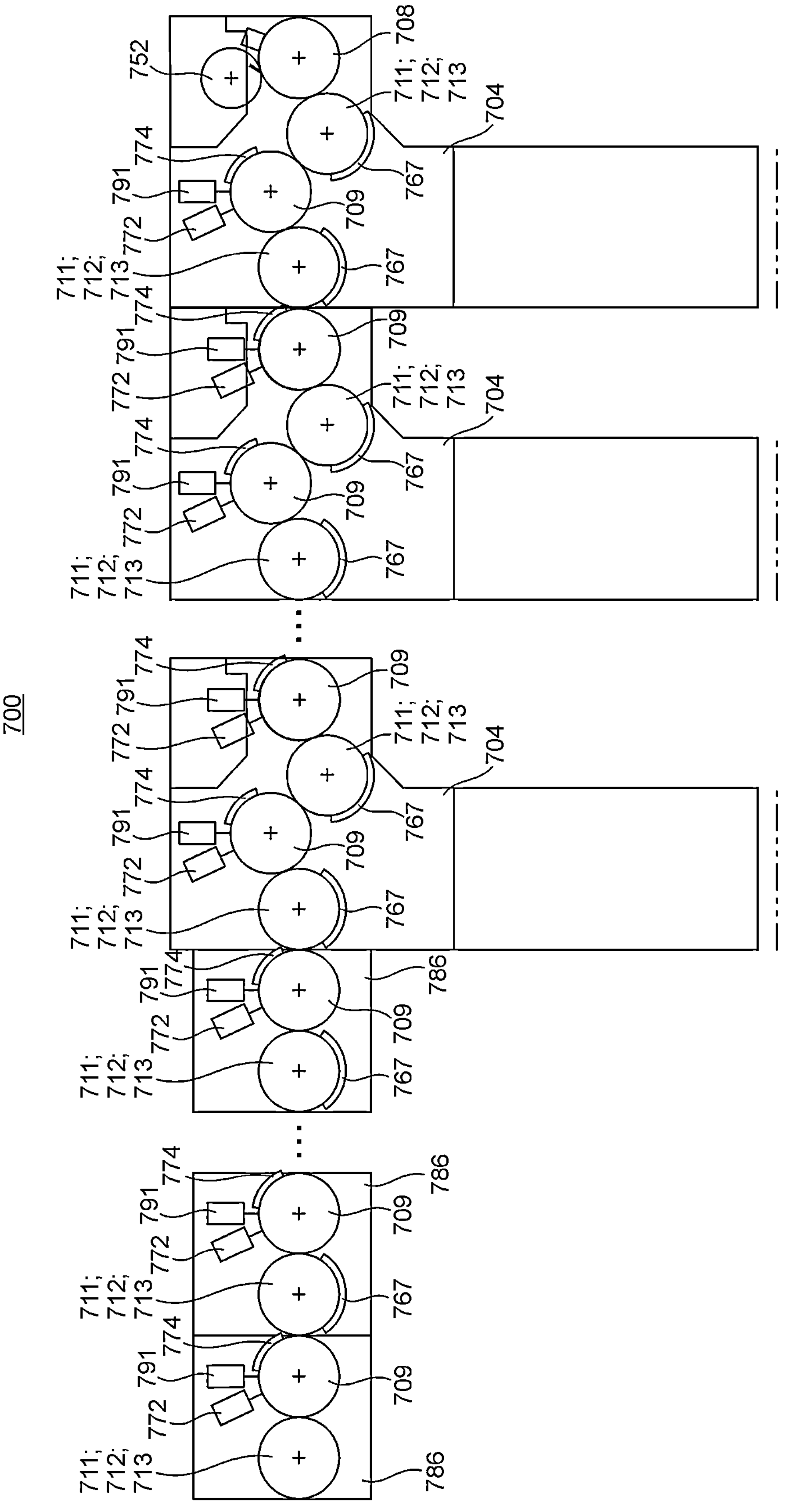
FIG. 13 a schematic representation of a base module carrying a tool-dependent printing nip and a non-impact printing position comprising an alignment device, pre-alignment devices, simultaneous magnetic devices and a curing device, as well as at least two base modules, which each carry two non-impact printing positions comprising an alignment device, pre-alignment devices, simultaneous magnetic devices and a curing device, as well as at least three additional modules, which each carry a non-impact printing position comprising an alignment device, pre-alignment devices, simultaneous magnetic devices and a curing device.
Figure 14:
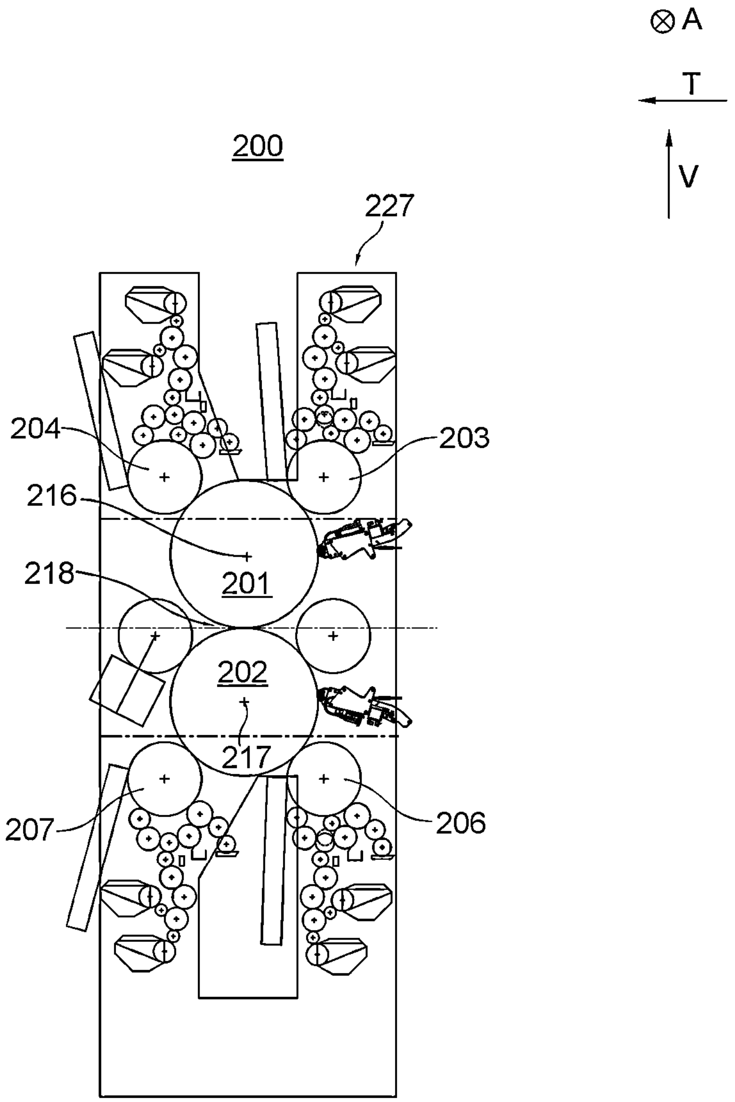
FIG. 14 a schematic representation of a simultaneous double printing unit.
Figure 16:
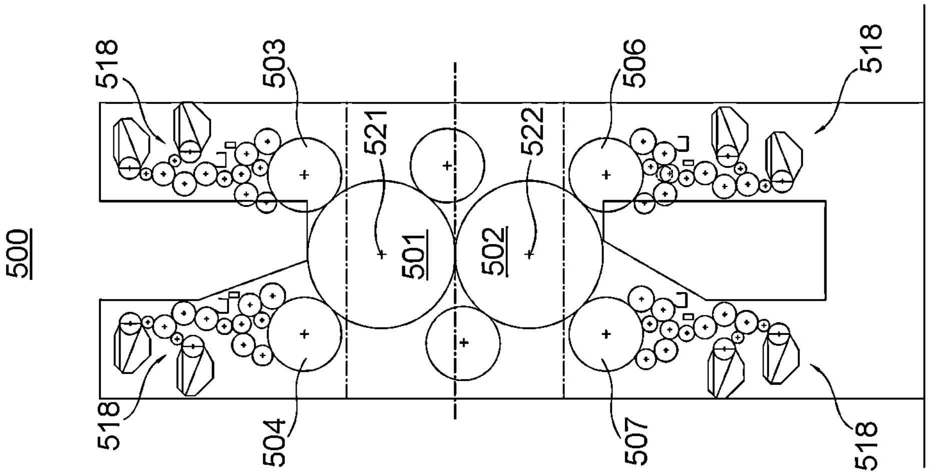
FIG. 16 a schematic representation of a numbering printing unit.
Figure 15:
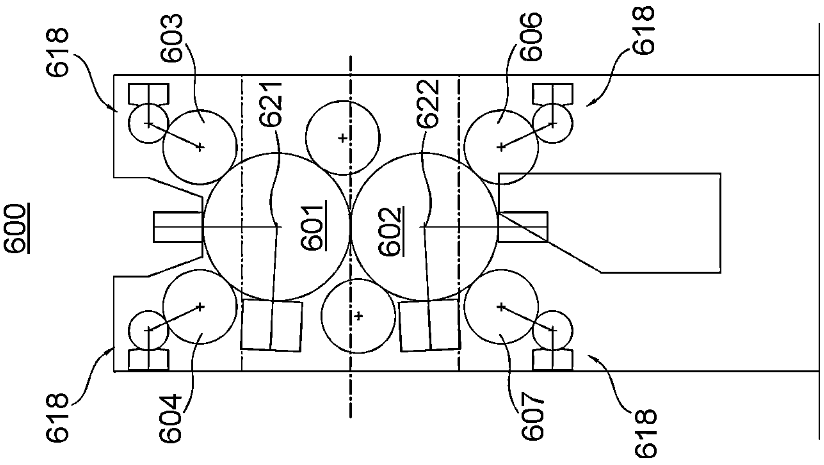
FIG. 15 a schematic representation of a flexographic printing unit.

One example of a printing unit 700 comprises several base modules 704 and several additional modules 786. A base module 704 carries a tool-dependent printing nip 758 and a non-impact printing position 787 comprising an alignment device 771 and a curing device 772. Two base modules 704 each carry two non-impact printing positions 787 comprising an alignment device 771 and a curing device 772. Each of the additional modules 786 carries a non-impact printing position 787 comprising an alignment device 771 and a curing device 772. Each alignment device 771 comprises an alignment cylinder 709, a pre-alignment device 767, and a simultaneous magnetic device 774. (This is also shown by way of example in FIG. 13).

An inspection unit 400 is preferably designed as a separate module 400. The at least one inspection unit 400 preferably comprises at least one rotational transport body 407 for transporting sheets 02 with which at least one inspection device 402; 403 is aligned. This rotational transport body 407 is designed, for example, as a suction drum 407. The inspection unit 400 preferably comprises a dedicated frame 401, which rotatably carries the at least one rotational transport body 407. The inspection unit 400 preferably comprises an input interface 408 for receiving sheets and an output interface 409 for delivery sheets.

In an alternative or additional refinement, the inspection unit 400 is preferably characterized in that the input interface 408 and the output interface 409 are arranged at the same height. In an alternative or additional refinement, the inspection unit 400 is preferably characterized in that the at least one inspection device 402; 403 is arranged so as to be aligned from above with a respective rotational transport body 407 and/or that the at least one inspection device 402; 403 is arranged so as to be aligned from beneath with a respective rotational transport body 407.

In an alternative or additional refinement, the inspection unit 400 is preferably characterized in that the respective at least one inspection device 402; 403 in each case comprises at least one sensor 404 designed, for example, as a line camera 404 and/or at least one illumination means 406 carried, in particular, by the frame 401 of the inspection unit 400.

In an alternative or additional refinement, the printing machine 01 is preferably characterized in that the printing machine 01 comprises at least one sheet feeder 100 and at least one printing unit 200; 500; 600; 700 and at least one sheet delivery 900 and at least one above-described inspection unit 400. In an alternative or additional refinement, the printing machine 01 is preferably characterized in that the respective frame 401 of the at least one inspection unit 400 differs from a frame of the sheet feeder 100 and from a frame 701 of the at least one printing unit 200; 500; 600; 700 and from a frame of the at least one sheet delivery 900. The frame 400 of the inspection unit 400 is preferably connected to one or more frames of adjoining units, such as the sheet feeder 100 and/or printing unit 200; 500; 600; 700 and/or sheet delivery 900.

In an alternative or additional refinement, the printing machine 01 is preferably characterized in that the printing machine 01 comprises an inspection unit 400 that comprises exactly one rotational transport body 412; 413 for transporting sheets 02 and/or that the printing machine 01 comprises an inspection unit that comprises exactly two rotational transport bodies 412; 413 for transporting sheets 02.

A respective printing machine 01 preferably in each case comprises at least one printing unit 700 designed as a screen printing unit 700. A substrate feed device 100 designed as a sheet feeder 100 is in each case arranged directly or indirectly upstream from the respective printing unit 700 designed, in particular, as a screen printing unit 700, and a sheet delivery 900 designed as a multiple pile delivery unit 900 is arranged directly or indirectly downstream therefrom. The respective printing machine 01 can be modified to the effect that it can additionally comprise further sheet processing units 200; 500; 600 between the sheet feeder 100 and the sheet delivery 900.

The sheet-fed printing machine 01 preferably comprises a main drive, which drives a gear train. Preferably at least all rotational transport bodies 708; 709; 711; 712; 713; of the printing unit 700 designed, in particular, as a screen printing unit 700 can be driven by way of this gear train, more preferably also rotational transport bodies of potential other printing units 200; 500; 600 and/or of the sheet feeder 100 and/or of the sheet delivery 900.

The printing machine 01 preferably comprises at least one above-described printing unit 700 and is additionally characterized in that the printing machine 01 additionally comprises at least one further printing unit 200; 500; 600, which is designed as a simultaneous printing unit 200, in particular as a sheet simultaneous printing unit 200 and/or which is designed as a numbering printing unit 500, in particular a sheet numbering printing unit 500, and/or which is designed as a flexographic printing unit 600. In an additional or alternative refinement, the printing machine 01 preferably additionally comprises at least one further printing unit 200; 500; 600, which more preferably is designed as a simultaneous printing unit 200, in particular a sheet simultaneous printing unit 200, and/or which is designed as a numbering printing unit 500, in particular a sheet numbering printing unit 500, and/or which is designed as a flexographic printing unit 600.

In an additional or alternative refinement, the printing machine 01 preferably comprises at least one sheet-fed printing unit 200 designed for a simultaneous printing process. Such a sheet-fed printing unit 200 is also referred to as a sheet simultaneous printing unit 200 or sheet collect printing unit 200. The simultaneous printing process is in particular characterized in that printing ink stemming from different forme cylinders 203; 204; 206; 207 is first collected on a collect cylinder 201; 202, which is preferably designed as a transfer cylinder 201; 202, and is then transferred concomitantly, that is, simultaneously, onto a respective sheet 02. This transfer preferably takes place directly from the collect cylinder 202, which is then preferably also designed as a transfer cylinder 201; 202. The respective transfer cylinder 201; 202 preferably cooperates with a respective impression cylinder 201; 202. Preferably, in each case a transfer cylinder 201; 202 and an impression cylinder 201; 202 together form a printing nip 218, wherein the sheets 02 are preferably transported through this printing nip 218 and/or wherein the sheets 02 are preferably provided with printing ink in this printing nip 218, in particular with the collected printing inks. Preferably, two cylinders 201; 202 cooperate in such a way that each is designed as a transfer cylinder 201; 202 and at the same time acts as an impression cylinder 201; 202 for the respective other of these two cylinders 201; 202. The sheet simultaneous printing unit 200 is then, for example, also referred to as a simultaneous blanket-to-blanket printing unit 200 and is used, in particular, for simultaneously printing a respective sheet 02 on two sides. Preferably, only one of these collect cylinders 201; 202 is designed as a sheet transport cylinder 201; 202.

The at least one sheet simultaneous printing unit 200 comprises at least two forme cylinders 203; 204; 206; 207. Each respective forme cylinder 203; 204; 206; 207 is preferably arranged so as to be directly in contact with a respective impression cylinder 201; 202 and/or so as to directly cooperate and/or be capable of directly cooperating therewith. The sheet simultaneous printing unit 200 preferably comprises four forme cylinders 203; 204; 206; 207, of which more preferably two are directly in contact with an in particular first shared collect cylinder 201; 202 and/or are arranged so as to directly cooperate and/or be capable of directly cooperating therewith, and of which more preferably two others are directly in contact with the other, in particular second shared collect cylinder 201; 202 and/or are arranged so as to directly cooperate and/or be capable of directly cooperating therewith.

Different printing formes, in particular printing plates, can be arranged on the respective forme cylinder 203; 204; 206; 207 of the sheet simultaneous printing unit 200, for example based on the print image to be printed. For example, at least one planographic printing forme can be arranged on the respective forme cylinder 203; 204; 206; 207. As an alternative or in addition, for example, at least one letterset printing forme can be arranged on the respective forme cylinder 203; 204; 206; 207. A letterset printing forme has only a relatively low height of the ink-transferring areas compared to the remaining printing plate and, in terms of the operating principle thereof, is comparable to a letterpress forme. Preferably, at least one inking unit 227 is provided per forme cylinder 203; 204; 206; 207.

In an alternative or additional refinement, the sheet simultaneous printing unit 200 is preferably characterized by comprising a first collect cylinder 201 and a second collect cylinder 202, which are directly in contact with one another and/or are arranged so as to directly cooperate with one another, and which each have an axis of rotation 216; 217, and is characterized in that an axial plane E1 is a plane E1 that includes both the axis of rotation 216 of the first collect cylinder 201 and the axis of rotation 217 of the second collect cylinder 202, and that a reference plane E2 is a plane E2 that includes at least one axis of rotation 216; 217 of such a collect cylinder 201; 202 and has a horizontal surface normal. These two collect cylinders 201; 202 are preferably arranged, at least during a processing operation, in particular a printing operation, in such a way that the angle of intersection between the axial plane E1 on the one hand and the reference plane E2 on the other hand is no more than 45°, more preferably no more than 30°, still more preferably no more than 15°, still more preferably no more than 10°, still more preferably no more than 5°, still more preferably no more than 2°, still more preferably no more than 1°, still more preferably no more than 0.5°, and still more preferably exactly 0°.

In an additional or alternative refinement, the printing machine 01 preferably comprises at least one sheet-fed printing unit 500 designed for a letterpress process. Such a sheet-fed printing unit 500 is also referred to as a letterpress printing unit 500. The letterpress process is used, for example, as a numbering printing method. Hereafter, comments are made with regard to a sheet numbering printing unit 500 which, however, also apply accordingly to general letterpress processes. In an additional or alternative refinement, the printing machine 01 preferably comprises at least one sheet-fed printing unit 500 designed for a numbering printing process. Such a sheet-fed printing unit 500 is also referred to as a sheet numbering printing unit 500. The sheet numbering printing unit 500 preferably comprises at least one impression cylinder 501; 502, which is preferably designed as a respective sheet transport cylinder 501; 502. For example, the sheet numbering printing unit 500 comprises two cylinders 501; 502 of a first type, which more preferably are designed as a respective impression cylinder 501; 502 and/or as a respective sheet transport cylinder 501; 502 and/or which are directly in contact with one another and/or are arranged so as to directly cooperate and/or be capable of directly cooperating with one another.

A respective numbering of the sheets 02 and/or of the multiple-up copies of the sheets 02 embodied, in particular, as securities preferably takes place by means of a letterpress process, in particular using at least one numbering forme cylinder 503; 504; 506; 507, which more preferably comprises at least one numbering unit. Preferably, individual numbering units are employed, of which more preferably multiple are arranged on a shared numbering forme cylinder 503; 504; 506; 507. The respective numbering forme cylinder 503; 504; 506; 507 preferably comprises multiple numbering units, which in the circumferential direction thereof are arranged one behind the other on the respective numbering forme cylinder 503; 504; 506; 507, for example at least two or at least four or at least eight or at least twelve, and/or the respective numbering forme cylinder 503; 504; 506; 507 comprises multiple numbering units, which are arranged next to one another in the transverse direction A on the respective numbering forme cylinder 503; 504; 506; 507. The respective at least one numbering unit comprises, for example, a counting unit including multiple symbol rolls, wherein the symbol rolls in each case include set-apart, in particular raised areas in the form of symbols, such as for example numbers and/or letters. Depending on the position of a particular symbol roll, a different symbol is located on the outside, in particular on the outside based on an axis of rotation of the respective numbering forme cylinder 503; 504; 506; 507. Depending on the relative positions of the individual symbol rolls, the outer symbols of the counting unit collectively preferably yield an unambiguous serial number. Preferably, at least one inking unit 518 is provided per numbering forme cylinder 503; 504; 506; 507. Upon contact, the at least one inking unit 518 preferably provides the respective outer symbols of the numbering units of this particular numbering forme cylinder 503; 504; 506; 507 with printing ink. The respective numbering forme cylinder 503; 504; 506; 507 is rotated further and comes in contact with the respective sheet 02, transferring the printing ink in the form of the symbol onto the sheet 02. Preferably, the combination of the symbols is changed by the next time this numbering unit makes contact with the inking unit 518 so as to be able to transfer a different marking during the next contact with the corresponding sheet 02.

Each respective numbering forme cylinder 503; 504; 506; 507 is preferably arranged so as to be directly in contact with a respective impression cylinder 501; 502 and/or so as to directly cooperate and/or be capable of directly cooperating therewith. Preferably, impression cylinders 501; 502 of the sheet numbering printing unit 500 are also designed as sheet transport cylinders 501; 502, in particular regardless of their quantity.

The comments made above and/or below regarding the sheet numbering printing unit 500 also apply accordingly, in general terms, to a letterpress printing unit 500, provided this does not result in any contradictions, in particular with the modification that letterpress forme cylinders 503; 504; 506; 507 preferably carry respective inflexible printing formes, and consequently do not carry any numbering units, as is the case instead with numbering forme cylinders 503; 504; 506; 507.

In an additional or alternative refinement, the printing machine 01 preferably comprises at least one sheet processing unit 600 and/or sheet-fed printing unit 600 designed for a flexographic printing process. Such a sheet-fed printing unit 600 is also referred to as a flexographic printing unit 600. The flexographic printing method is used, for example, as a coating method, in particular as a varnishing method. The flexographic printing unit 600 preferably comprises at least one impression cylinder 601; 602, which is more preferably designed as a respective sheet transport cylinder 601; 602. More preferably, the flexographic printing unit 600 comprises two impression cylinders 601; 602, which more preferably are designed as respective sheet transport cylinders 601; 602 and/or which are directly in contact with one another and/or are arranged so as to directly cooperate and/or be capable of directly cooperating with one another. Preferably, impression cylinders 601; 602 of the flexographic printing unit 600 are also designed as sheet transport cylinders 601; 602, in particular regardless of their quantity.

The flexographic printing unit 600 preferably comprises at least one flexographic forme cylinder 603; 604; 606; 607. Preferably, at least one inking unit 618 is provided per flexographic forme cylinder 603; 604; 606; 607. A flexographic forme cylinder 603; 604; 606; 607 shall in particular be understood to mean a forme cylinder 603; 604; 606; 607 provided for a flexographic printing method and/or shall in particular be understood to mean a forme cylinder 603; 604; 606; 607 which is designed to carry at least one preferably exchangeable flexographic printing forme, in particular on the outer cylindrical surface thereof. Each respective flexographic forme cylinder 603; 604; 606; 607 is preferably arranged so as to be directly in contact with a respective impression cylinder 601; 602 and/or so as to directly cooperate and/or be capable of directly cooperating therewith.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A printing unit (700) configured as a screen printing unit (700), the printing unit (700) comprising:

a pair of cooperating rotational bodies (708; 752) including a screen printing forme cylinder (752) and an impression cylinder (708) cooperating therewith for forming a first tool-dependent printing nip (758) that is configured as a screen printing nip (758) for applying a coating agent to a substrate (02);

at least one first alignment cylinder (709) disposed along a transport path provided for transport of the substrate (02), downstream from the impression cylinder (708) of the first tool-dependent printing nip (758), wherein, the at least one first alignment cylinder (709), in a region of an outer circumference thereof, comprises a plurality of elements inducing a magnetic field;

at least one first print head (791) for forming at least one first non-impact printing position (787) disposed along the transport path, downstream from the first tool-dependent printing nip (758); and at least one first curing device (772) disposed along the transport path, downstream from the at least one first non-impact printing position (787), each at least one first curing device (772) having a respective first curing area (788) assigned thereto, wherein, at the at least one first non-impact printing position (787), the transport path provided for the transport of the substrate (02) includes the at least one first alignment cylinder (709) or a rotational transport body (711; 712; 713) arranged directly upstream from the at least one first alignment cylinder (709), wherein an additive for changing curing properties of applied material is situated in a supply reservoir (789) connected to the at least one first print head (791) for conducting the additive to the at least one first print head (791), wherein the at least one first print head (791) is configured to apply the additive to selected areas of the coating agent on the substrate (02) for enabling curing of the selected areas by the at least one first curing device (772), and wherein the at least one first curing device (772) is configured to cure the selected areas of the coating agent to which the additive is applied while leaving other areas of the coating agent to which the additive is not applied uncured for enabling subsequent reorientation of the uncured areas of the coating agent, the at least one first curing device (772) comprising at least one of a radiation source (792) configured to provide UV radiation for curing the selected areas, or an electron beam source (792) configured to provide an electron beam for curing the selected areas.

2. The printing unit according to claim 1, characterized in that, in the respective first curing area (788) of a respective first curing device (772) of the at least one first curing device (772), the transport path provided for the transport of substrate (02) includes the at least one first alignment cylinder (709) or a rotational transport body (711; 712; 713) arranged directly downstream from the at least one first alignment cylinder (709).

3. The printing unit according to claim 1, characterized in that a rotational transport body (711; 712; 713), which is arranged along the transport path provided for the transport of substrate (02) directly downstream from the impression cylinder (708) of the first tool-dependent printing nip (758), is configured as at least one of: a transfer drum (711), a blower drum (712), a suction drum (713), or a rotational transport body (711; 712; 713) operating in a contactless manner except for gripper contacts.

4. The printing unit according to claim 1, characterized in that the at least one first print head (791) is configured as an ink jet print head (791).

5. The printing unit according to claim 1, characterized in that the printing unit (700) is configured as a sheet-fed printing unit (700).

6. The printing unit according to claim 1, characterized in that the printing unit (700), along the transport path provided for the transport of substrate (02), downstream from the at least one first alignment cylinder (709), comprises at least one second alignment cylinder (709), and that the printing unit (700), along the transport path, downstream from the at least one first alignment cylinder (709), comprises at least one second non-impact printing position (787), to which at least one second print head (791) is assigned, and that the printing unit (700), along the transport path, downstream from the at least one second non-impact printing position (787), comprises at least one second curing device (772), each at least one second curing device (772) having a respective second curing area (788) assigned thereto.

7. The printing unit according to claim 6, characterized in that the at least one second alignment cylinder (709), in a region of an outer circumference thereof, comprises a plurality of elements inducing a magnetic field.

8. The printing unit according to claim 6 characterized in that the coating agent includes magnetic or magnetizable particles that are able to be aligned by the plurality of elements of the at least one first alignment cylinder (709) and fixed in a first alignment in the selected areas by curing of the additive, and the at least one second alignment cylinder (709) is configured to align the magnetic or magnetizable particles in uncured areas of the coating agent differently from the at least one first alignment cylinder.

9. The printing unit according to claim 8 characterized in that the at least one second print head (791) is configured to apply the additive to additional selected areas of the coating agent on the substrate (02) for curing of the additional selected areas and for fixing in a second alignment at least some of the magnetic or magnetizable particles of the coating agent aligned differently by the at least one second alignment cylinder (709).

10. The printing unit according to claim 6 characterized in that the additive applied by the at least one first print head (791) is a first additive, a second additive applied by the at least one second print head (791) has curing properties that differ from curing properties of the first additive, the at least one first curing device is configured to activate the curing properties of the first additive, and the at least one second curing device is configured to activate the curing properties of the second additive.

11. A printing machine (01), the printing machine (01) comprising at least one printing unit (700) according to claim 1, characterized in that the printing machine (01) additionally comprises at least one further printing unit (200; 500; 600), which is configured as a simultaneous printing unit (200) and/or that the printing machine (01) additionally comprises at least one further printing unit (200; 500; 600), which is configured as a numbering printing unit (500) and/or that the printing machine (01) additionally comprises at least one further printing unit (200; 500; 600), which is configured as a flexographic printing unit (600).

12. The printing unit according to claim 1, characterized in that the coating agent includes magnetic or magnetizable particles that are able to be aligned by the plurality of elements of the at least one first alignment cylinder (709).

13. The printing unit according to claim 12, characterized in that curing the selected areas having the additive applied causes an alignment of the magnetic or magnetizable particles of the coating agent that are associated with the selected areas to be fixed.

14. The printing unit according to claim 1 characterized in that the at least one first print head (791) is configured to write image information into the coating agent by application of the additive to the selected areas of the coating agent by the at least one first print head (791), the image information being subsequently fixed in the coating agent by curing of the selected areas.

* * * * *